(12) United States Patent
Yamazaki

(10) Patent No.: US 7,602,533 B2
(45) Date of Patent: Oct. 13, 2009

(54) IMAGE FORMATION WITH MERGING OF IMAGE DATA AND A SPECIFIC PATTERN BASED ON ACKNOWLEDGEMENT DATA OF PATTERN USAGE APPROVAL

(75) Inventor: Yoji Yamazaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 600 days.

(21) Appl. No.: 11/520,611

(22) Filed: Sep. 14, 2006

(65) Prior Publication Data

US 2007/0070475 A1   Mar. 29, 2007

(30) Foreign Application Priority Data

Sep. 29, 2005   (JP) .............................. 2005-285177

(51) Int. Cl.
*G06K 15/02* (2006.01)
*G06F 3/12* (2006.01)
*G06F 15/16* (2006.01)
*B41M 3/14* (2006.01)

(52) U.S. Cl. .................. 358/3.28; 358/1.14; 358/1.15; 358/1.16

(58) Field of Classification Search .................. 358/1.9, 358/3.28, 1.14, 1.15, 1.16, 403, 434, 435, 358/440, 468; 283/74, 113, 902
See application file for complete search history.

(56) References Cited

U.S. PATENT DOCUMENTS

| 5,621,503 | A  | * | 4/1997  | Komaki et al. | ............... | 399/366 |
| 6,661,933 | B1 | * | 12/2003 | Hisatomi et al. | ............ | 382/306 |

FOREIGN PATENT DOCUMENTS

| JP | 03-009874      |   | 1/1991 |
| JP | 2008206069 A   | * | 9/2008 |

* cited by examiner

*Primary Examiner*—Scott A Rogers
(74) *Attorney, Agent, or Firm*—Kubotera & Associates, LLC

(57) ABSTRACT

An image forming apparatus includes: a first storage unit for storing a specific pattern together with an identification mark; an acknowledgment data generating unit for generating acknowledgment data per a notice of usage approval of the specific pattern; a second storage unit for storing the acknowledgment data together with the identification mark; and a merging unit for merging and printing image data and the specific pattern upon receiving the image data together with identification information corresponding to the acknowledgment data.

15 Claims, 29 Drawing Sheets

51 Specific pattern usage approval information

| job_ID | Seal data ID | Client ID |
|---|---|---|
| JVLL | 0001 | ZZZZ |

FIG. 7

52 Acknowledgment data  17 Acknowledgment data storage unit

| job_ID | Password | Seal data ID |
|---|---|---|
| 3733 | ○×▲◇ | 0003 |
| 9822 | ▽▲◇× | 0001 |
| 8136 | ♡♠◇○ | 0002 |
| 1555 | □☆◆♡ | 0000 |

FIG. 8

71a: Specific pattern usage approval information

| job_ID | Seal data ID | Client ID | Next acknowledger ID |
|---|---|---|---|
| JVLL | 0001 | ZZZZ | N |

71b: Specific pattern usage approval information

| job_ID | Seal data ID | Client ID | Next acknowledger ID |
|---|---|---|---|
| JVLL | 0001 | ZZZZ | |

FIG. 25

IMAGE FORMATION WITH MERGING OF IMAGE DATA AND A SPECIFIC PATTERN BASED ON ACKNOWLEDGEMENT DATA OF PATTERN USAGE APPROVAL

BACKGROUND OF THE INVENTION AND RELATED ART STATEMENT

The present invention relates to an image forming apparatus such as a printer device, a facsimile device, a copier, and an image forming apparatus of an MFP (Multi Function Product) combining these devices having a function of overlapping a specific pattern on a document or image data. The present invention further relates to an image forming system including the image forming apparatus, and a method of forming an image.

In a conventional office system, image information of a seal of an acknowledger is stored in a memory in advance. When various documents are issued, a mark is printed on a document at a specific position for acknowledging the seal. The mark is read through an optical device to determine that the seal can be printed, so that the image information of the seal is printed (refer to Patent Reference).

Patent Reference: Japanese Patent Publication No. 3-9874

In the conventional system, the mark, i.e., the simple acknowledgment information, is printed on the document at a specific position for acknowledging the seal, so that the image information of the seal is printed. However, it is relatively easy to fabricate the mark. Accordingly, anyone is able to print the seal, thereby causing security problem.

In view of the problems described above, an object of the present invention is to provide an image forming apparatus, in which it is possible to solve the problems in the conventional system.

Further objects and advantages of the invention will be apparent from the following description of the invention.

SUMMARY OF THE INVENTION

In order to attain the objects described above, according to the present invention, an image forming apparatus comprises: a first storage unit for storing a specific pattern together with an identification mark; an acknowledgment data generating unit for generating acknowledgment data per a notice of usage approval of the specific pattern; a second storage unit for storing the acknowledgment data together with the identification mark; and a merging unit for merging and printing image data and the specific pattern upon receiving the image data together with identification information corresponding to the acknowledgment data.

With the configuration described above, the seal data is stored in advance, and the acknowledgment data is generated and sent per acknowledgment in response to a request for approval of usage of the seal data. When the image data is received together with the identification information corresponding to the acknowledgment data, the image data and the seal data are merged and printed. After the image data and the seal data are printed, the acknowledgment data is deleted. Accordingly, it is possible to securely prevent fabrication of the seal data.

BRIEF DESCRIPTION OF THE DRAWINGS

FIG. 7 is a schematic view showing an example of specific pattern usage approval information according to the first embodiment of the present invention;

FIG. 8 is a schematic view showing a configuration of an acknowledgment data storage unit according to the first embodiment of the present invention;

FIG. 25 is a schematic view showing an example of specific pattern usage approval information according to the fifth embodiment of the present invention;

DETAILED DESCRIPTION OF PREFERRED EMBODIMENTS

Figure 1:
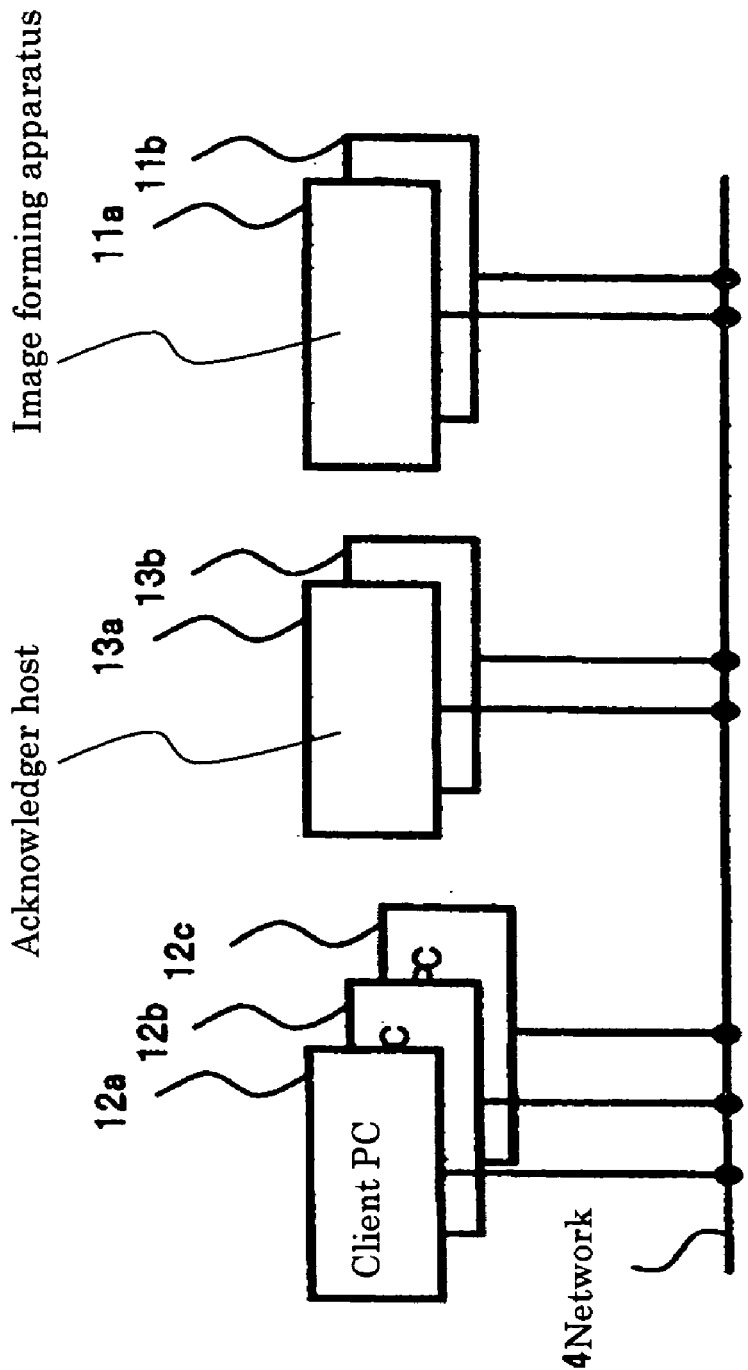
FIG. 1 is a block diagram showing a configuration of an image forming system according to a first embodiment of the present invention.

Hereunder, embodiments of the present invention will be explained with reference to the accompanying drawings. Components common in the drawings are designated by the same reference numerals. In the embodiments, a specific pattern to be merged and printed is seal image data such as an inspection seal and an acknowledgment seal as an example. The specific pattern may include a special mark image or a signature image instead of the seal image data.

First Embodiment

In an image forming apparatus and an image forming system according to a first embodiment, seal data is stored in advance, and acknowledgment data is generated and sent per acknowledgment in response to a request for approval of usage of the seal data. When image data is received together with identification information corresponding to the acknowledgment data, the image data and the seal data are merged and printed. After the image data and the seal data are printed, the acknowledgment data is deleted.

FIG. 1 is a block diagram showing a configuration of the image forming system according to the first embodiment of the present invention. As shown in FIG. 1, the image forming system includes client PCs 12 (12a, 12b, and 12c); acknowledger hosts 13 (13a and 13b); and image forming apparatus 11 (11a and 11b), respectively connected through a network 4.

The client PC 12 has a function of requesting an approval of usage of seal data to the acknowledger host 13, and a function of receiving acknowledgment data (described later) generated in the image forming apparatus 11 and sending arbitrary image data to be printed together with the acknowledgment data.

The acknowledger host 13 has a function of directing registration of the seal data, and a function of adding a seal data ID specific to the acknowledger host 13 to the request of an approval of usage of the seal data from the client PC 12 to create seal data usage approval information.

The image forming apparatus 11 has a function of registering the seal data; a function of creating the acknowledgment data (described later) as identification information according to the seal data usage approval information from the acknowledger host 13, and sending the acknowledgment data to the client PC 12; and a function of merging and printing the acknowledgment data and the image data when the image forming apparatus 11 receives the image data together with the acknowledgment data.

The network 4 includes a wired connection network such as LAN and USB, or a wireless connection network such as a wireless LAN, as far as data communication is possible among the client PC 12, the acknowledger host 13, and the image forming apparatus 11. The image forming system may include a single one of each of the client PC 12, the acknowledger host 13, and the image forming apparatus 11, or a plurality thereof.

Figure 2:
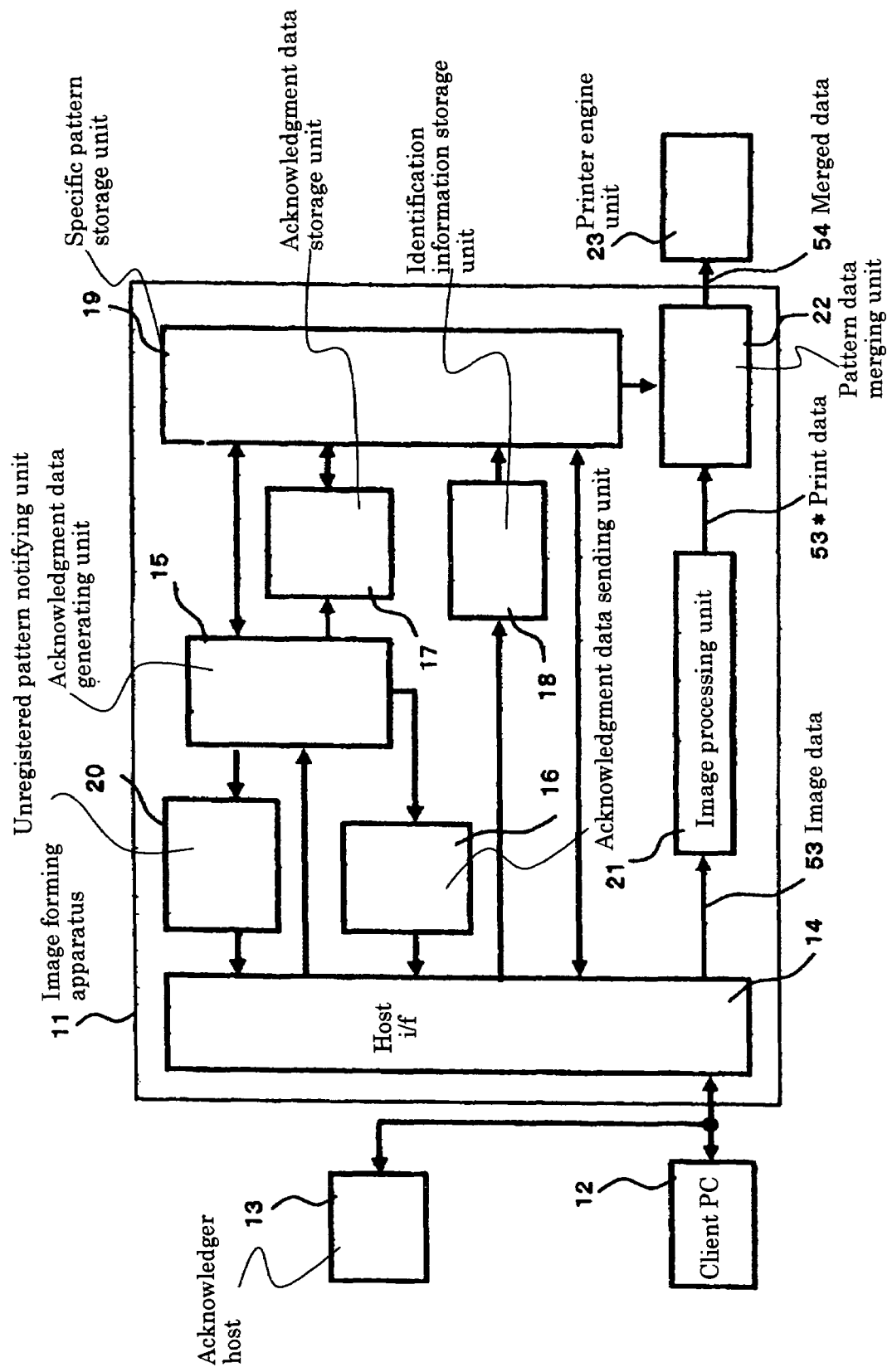
FIG. 2 is a block diagram showing a configuration of an image forming apparatus according to the first embodiment of the present invention.

FIG. 2 is a block diagram showing a configuration of the image forming apparatus 11 according to the first embodiment of the present invention. As shown in FIG. 2, the image forming apparatus 11 includes a host i/f 14 connected to the client PC 12 and the acknowledger host 13; an acknowledgment data generating unit 15 for generating the acknowledgment data; an acknowledgment data sending unit 16 for sending the acknowledgment data; an acknowledgment data storage unit 17 for storing the acknowledgment data; an identification information storage unit 18 for storing identification information sent from the client PC 12; a specific pattern storage unit 19 for storing the seal data; a unregistered pattern notifying unit 20 for notifying the acknowledger host 13 that the seal data requested for acknowledgment is not registered; an image processing unit 21 for converting image data 53 sent from the client PC 12 to print data 53*; and a pattern data merging unit 22 for merging the seal data to the print data 53* to create merged data 54. The image forming apparatus 11 is connected to a printer engine unit 23 for printing on a medium.

The acknowledgment data generating unit 15 has a function of extracting the seal data ID for identifying the seal image data, a job_ID for coding a job giving an approval of usage of the seal data, and a client ID for identifying a requester from specific pattern usage approval information; a function of creating the acknowledgment data including a password for acknowledging the job_ID and usage of the seal data; a function of sending the acknowledgment data the client PC 12 corresponding to the client ID through the acknowledgment data sending unit 16; and a function of storing the acknowledgment data in the acknowledgment data storage unit 17.

The acknowledgment data sending unit 16 has a function of sending the acknowledgment data to the client PC 12 indicated by the client ID. The unregistered pattern notifying unit 20 has a function of notifying the acknowledger host 13 that the pattern is not registered when the seal data corresponding to the acknowledgment code created at the acknowledgment data generating unit 15 is not registered in the specific pattern storage unit 19.

The specific pattern storage unit 19 has a function of storing the seal data and an ID code thereof contained in a notice when the notice of registration of the specific pattern is received. The identification information storage unit 18 has a function of storing the identification information contained in the acknowledgment request sent from the client PC 12.

The image processing unit 21 has a function of converting the image data 53 sent from the client PC 12 to the print data 53*. When the specific pattern usage approval information matches to the identification information stored in the identification information storage unit 18, the seal data requested for the usage approval is retrieved. The pattern data merging unit 22 merges the seal data to the image data 53, and sends the merged data 54 to the printer engine unit 23.

Figure 5:
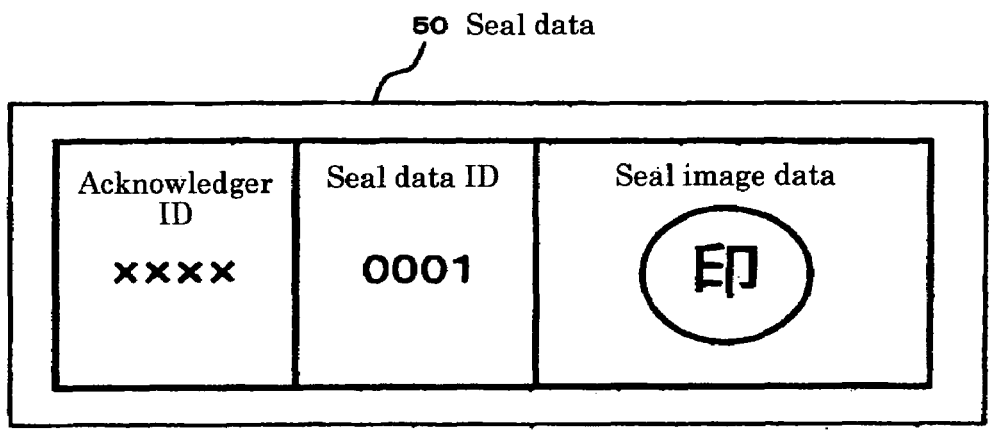
FIG. 5 is a schematic view showing an example of seal data according to the first embodiment of the present invention.

FIG. 5 is a schematic view showing an example of the seal data according to the first embodiment of the present invention. As shown in FIG. 5, the seal data contains an acknowledger ID for identifying an acknowledger; the seal data ID; and the seal image data.

Figure 6:
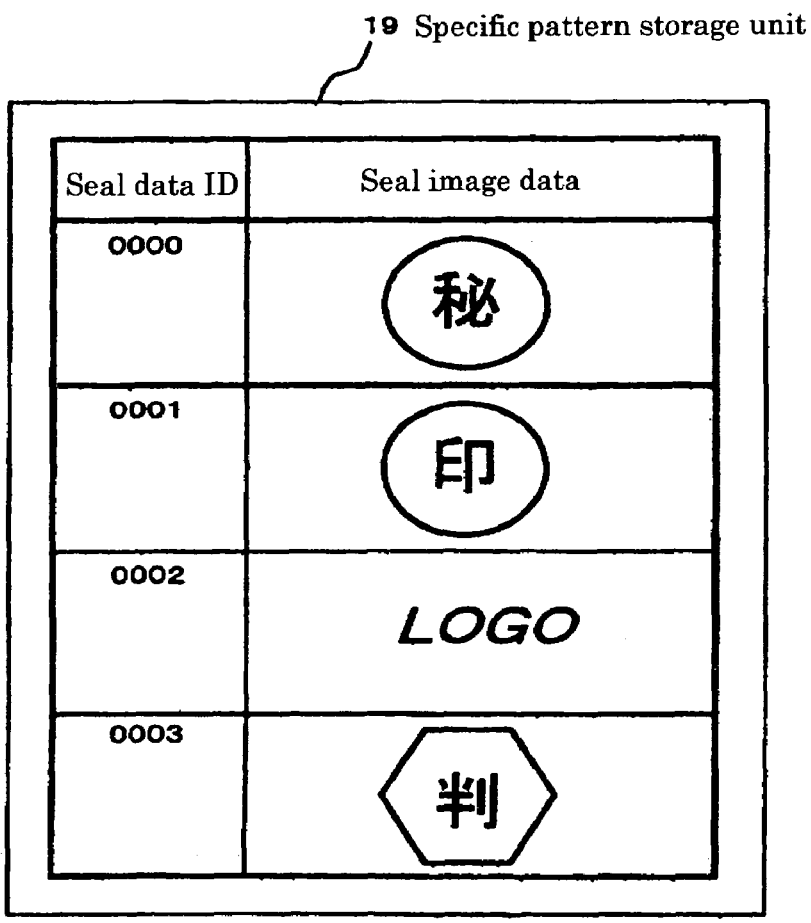
FIG. 6 is a schematic view showing an example of a specific pattern storage unit according to the first embodiment of the present invention.

FIG. 6 is a schematic view showing an example of the specific pattern storage unit 19 according to the first embodiment of the present invention. As shown in FIG. 6, the specific pattern storage unit 19 stores the seal data ID and the seal image data corresponding to each other. The seal image data may be compressed before being stored so that a data capacity is reduced.

FIG. 7 is a schematic view showing an example of the specific pattern usage approval information 51 according to the first embodiment of the present invention. As shown in FIG. 7, the specific pattern usage approval information 51 contains the job_ID of the job requested for the usage approval of the seal image data; the seal data ID of the seal image data of which the usage approval is requested; and the client ID of the client PC 12 requesting the usage approval.

FIG. 8 is a schematic view showing a configuration of the acknowledgment data storage unit 117 according to the first embodiment of the present invention. As shown in FIG. 8, the acknowledgment data 52 contains the job_ID of the job requested but not merged and printed yet; and a password for authenticating the usage of the corresponding seal image data. Further, the acknowledgment data storage unit 17 stores the corresponding seal data IDs.

Figure 9:
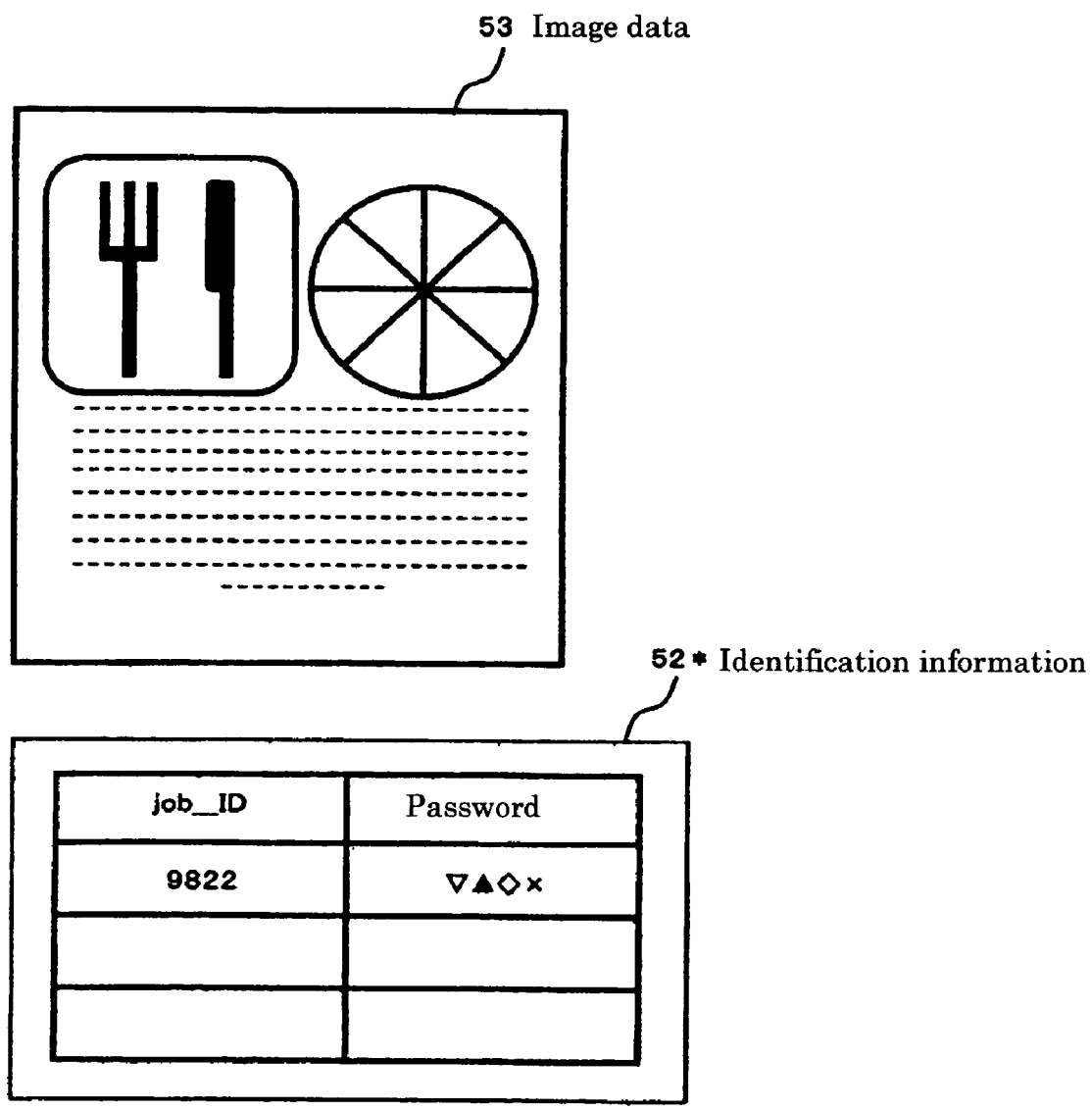
FIG. 9 is a schematic view showing a configuration of data upon sending image data according to the first embodiment of the present invention.

FIG. 9 is a schematic view showing the identification information 52* and the image data 53 according to the first embodiment of the present invention. As shown in FIG. 9, the identification information 52* contains the job_ID of the job requested for the usage approval of the seal image data; and the password for authenticating the usage of the seal image data. FIG. 9 is a schematic view showing a configuration of the data when the client PC 12 sends the image data 53 to the image forming apparatus 11 after the client PC 12 receives the acknowledgment data 52 from the image forming apparatus 11, in which the identification information 52* is added to the image data 53.

Figure 3:
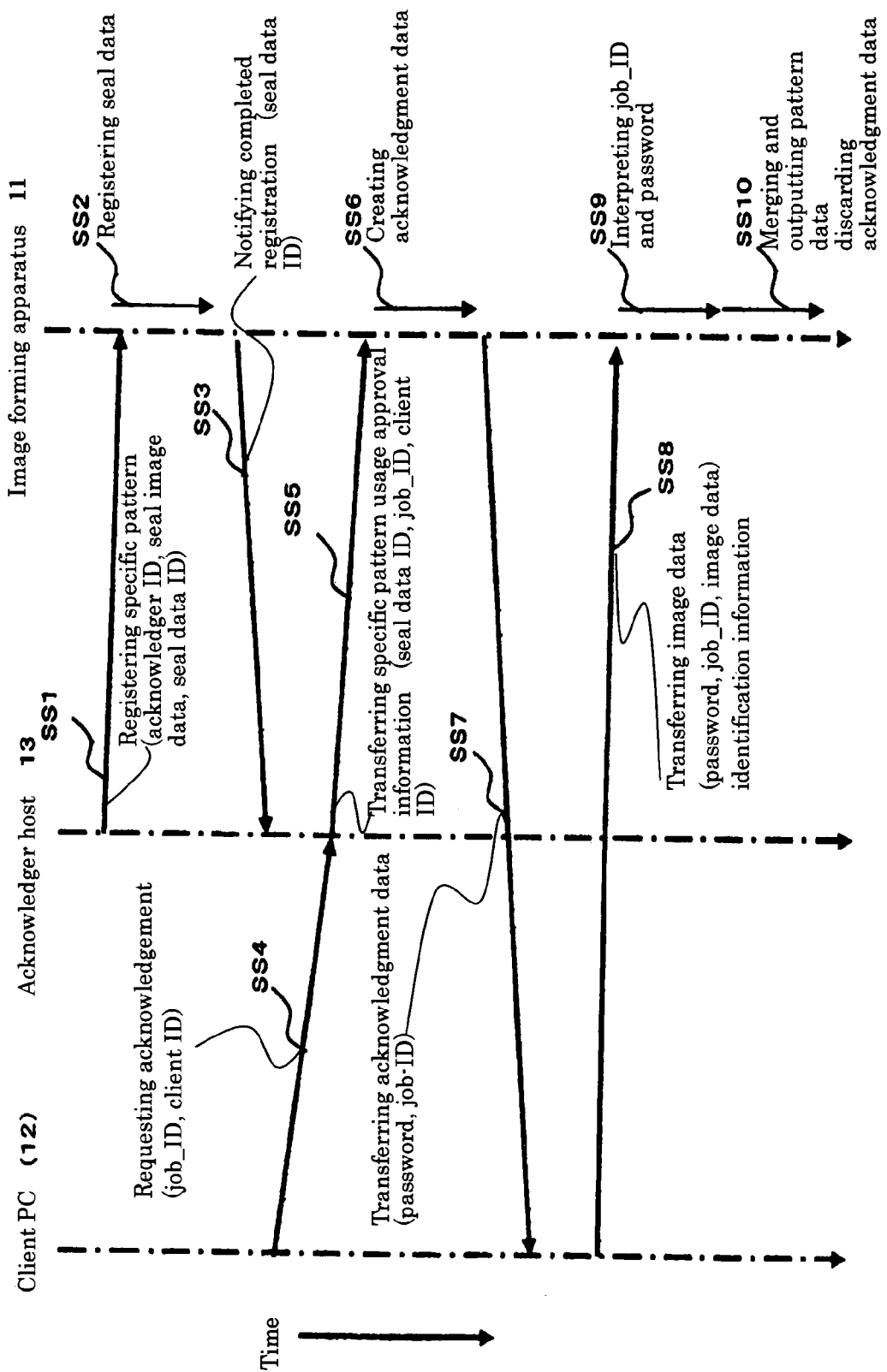
FIG. 3 is a schematic view showing a data flow of the image forming system according to the first embodiment of the present invention.
Figure 4:
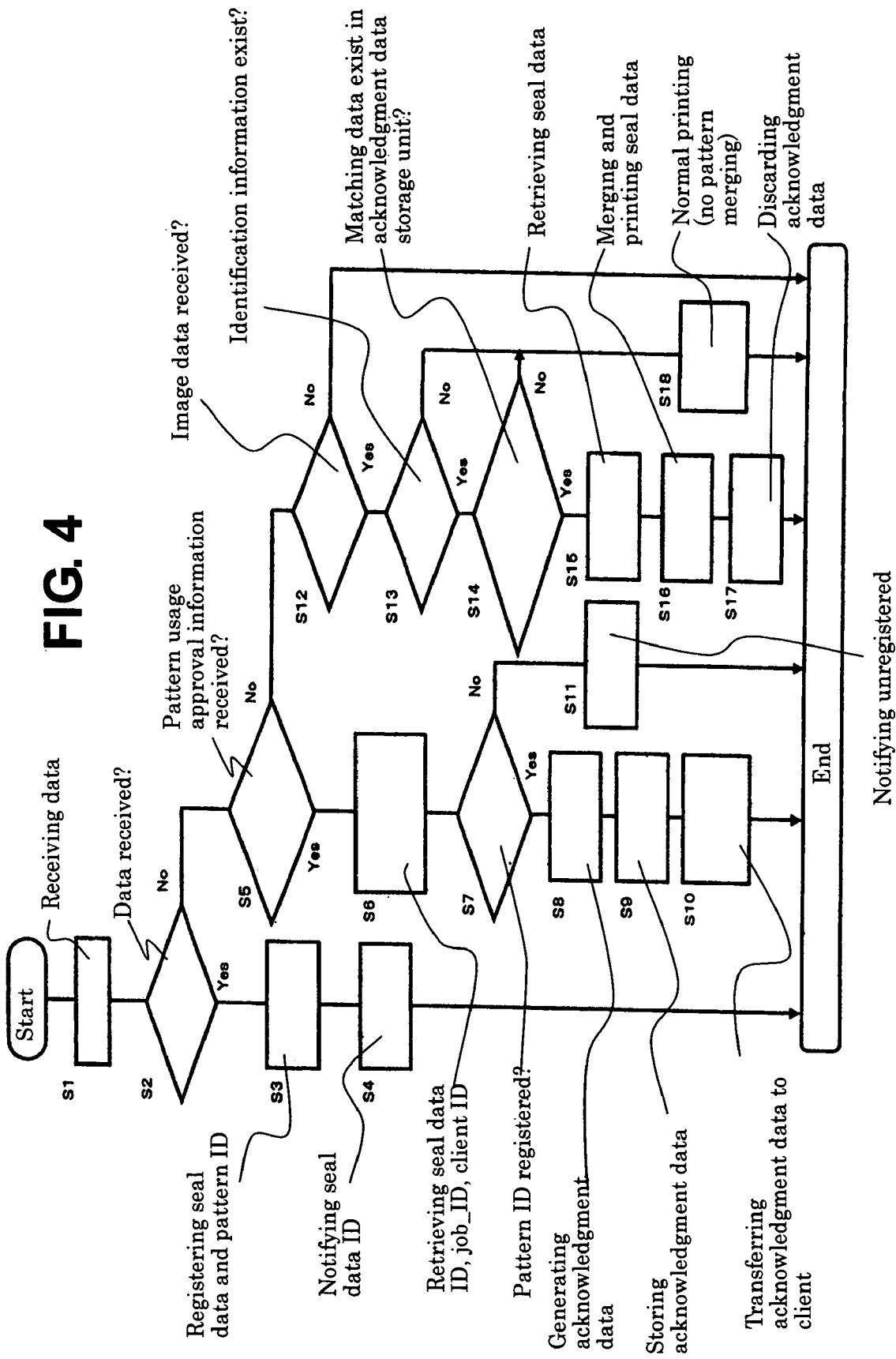
FIG. 4 is a flow chart showing an operation of the image forming apparatus according to the first embodiment of the present invention.

An operation of the image forming system according to the first embodiment of the present invention will be explained next with reference to FIGS. 3 and 4. FIG. 3 is a schematic view showing a data flow of the image forming system according to the first embodiment of the present invention. FIG. 4 is a flow chart showing an operation of the image forming apparatus 11 according to the first embodiment of the present invention.

An operation of registering the seal image data, i.e., one of specific patterns, will be explained first. In step SS1, the registration of the seal data is directed from the acknowledger host 13 to the image forming apparatus 11. The direction of the registration of the seal data includes the acknowledger ID, the seal data ID, and the seal image data as the seal data.

In step SS2, after receiving the direction, the image forming apparatus 11 registers the seal data. In step SS3, the image forming apparatus 11 notifies the acknowledger host 13 that the seal data ID and the seal data are registered, thereby completing the operation of registering the specific pattern.

An operation of merging and printing the seal image data and the image data will be explained next. In step SS4, the client PC 12 requests the acknowledger host 13 to merge and print the seal data desired. The request contains the job_ID as the code identifying the job requested for the acknowledgment, and the client ID for identifying the client PC 12. The request may be performed through an ordinary email service or a workflow service.

In step SS5, after receiving the request for merging and printing the seal data, the acknowledger host 13 sends the specific pattern usage approval information 51 to the image forming apparatus 11. The specific pattern usage approval information 51 contains the job_ID, the client ID, and the seal data ID specific to the acknowledger host 13 and added by the acknowledger host 13.

In step SS6, after receiving the specific pattern usage approval information 51, the image forming apparatus 11 creates the acknowledgment data 52. In step SS7, the image forming apparatus 11 sends the acknowledgment data 52 to the client PC 12. As shown in FIG. 8, the acknowledgment data 52 contains the job_ID and the password. The password may be created through multiplication, subtraction, or division using a random number and the seal data ID after the random number is generated with a random number generator. The password may be created through changing a calculation method such as multiplication, subtraction, and division.

In step SS8, after receiving the acknowledgment data 52, the client PC 12 adds the job_ID and the password, i.e., the identification information 52* received, to the image data 53 to be printed, and sends them to the image forming apparatus 11. In step SS9, after receiving the image data 53 and the identification information 52*, the image forming apparatus 11 performs authentication based on the job_ID and the password, i.e., the identification information 52* received. Then, the image forming apparatus 11 retrieves the seal data ID corresponding to the job_ID from the acknowledgment data storage unit 17 and the seal data corresponding to the seal data ID from the specific pattern storage unit 19. In step SS10, the image forming apparatus 11 merges and prints the seal data and the image data 53 received. After printing, the acknowledgment data 52 corresponding to the job_ID of the acknowledgment data storage unit 17 is discarded, thereby completing the operation of merging and printing the specific pattern.

With reference to FIG. 4, the operation of the image forming apparatus 11 will be explained in detail. In step S1, the host i/f 14 receives data sent from the client PC 12 or the acknowledger host 13. In step S2, it is determined whether the data received is the seal data 50 sent from the acknowledger host 13. In step S3, when the data received is the seal data 50, the seal data 50 is stored in the specific pattern storage unit 19. In step S4, the acknowledger host 13 is notified through the host i/f 14 that the seal data 50 is stored. In step S5, when the data received is not the seal data 50, the host i/f 14 determines whether the data is the specific pattern usage approval information 51 sent from the acknowledger host 13 when the client PC 12 requests the acknowledgment to the acknowledger host 13.

In step S6, when the data is the specific pattern usage approval information 51, the acknowledgment data generating unit 15 retrieves the job_ID, the seal data ID, and the client ID from the specific pattern usage approval information 51. In step S7, it is verified whether the seal data corresponding to the seal data ID retrieved exists in the specific pattern storage unit 19. In step S8, when the seal data exists, the acknowledgment data generating unit 15 creates the acknowledgment data 52 from the specific pattern usage approval information 51. In step S9, the acknowledgment data 52 created is stored in the acknowledgment data storage unit 17. In step S10, the acknowledgment data sending unit 16 sends the acknowledgment data 52 to the client PC 12 corresponding to the client ID retrieved in step S6 through the acknowledger host 13, thereby completing the operation of merging and printing the specific pattern.

When the seal data does not exist in step S7, in step S11, the unregistered pattern notifying unit 20 is notified that the seal data does not exist. Then, the unregistered pattern notifying unit 20 notifies the acknowledger host 13 through the host i/f 14 that the pattern is not registered, thereby completing the operation of merging and printing the specific pattern.

When the data received is not the specific pattern usage approval information 51 in step S5, in step S12, the host i/f 14 determines whether the data are the image data 53 sent from the client PC 12. When it is determined that the data is the image data 53 sent from the client PC 12, in step S13, the host i/f 14 determines whether the identification information 52* is added. When the identification information 52* is added, in step S14, the identification information 52* is stored in the identification information storage unit 18, so that the identification information 52* stored in the identification information storage unit 18 is compared with the acknowledgment data 52 stored in the acknowledgment data storage unit 17.

When there is the acknowledgment data 52 matching to the identification information 52*, in step S15, the seal data ID of the acknowledgment data 52 matched is retrieved, and the corresponding seal data is retrieved from the specific pattern storage unit 19, so that the seal data ID and the seal data are sent to the pattern data merging unit 22. In step S16, the image processing unit 21 converts the image data received to the print data, and the pattern data merging unit 22 merges the print data to the seal data to be sent to the printer engine unit 23. In step S17, after sending the data, the acknowledgment data 52 in the acknowledgment data storage unit 17 corresponding to the job_ID sent is discarded, thereby completing the operation of merging and printing the specific pattern.

When it is determined that the image data 53 is not received in step S12, the operation of merging and printing the specific pattern is completed as is. When it is determined that the identification information 52* is not in the image data 53 in step S13, or that the matching data does not exist in the acknowledgment data storage unit 17 in step S14, the image processing unit 21 converts the image data received to the print data. In step S18, the print data passes through the pattern data merging unit 22 and is sent to the printer engine unit 23, so that the print data is printed without the merging.

Figure 10:
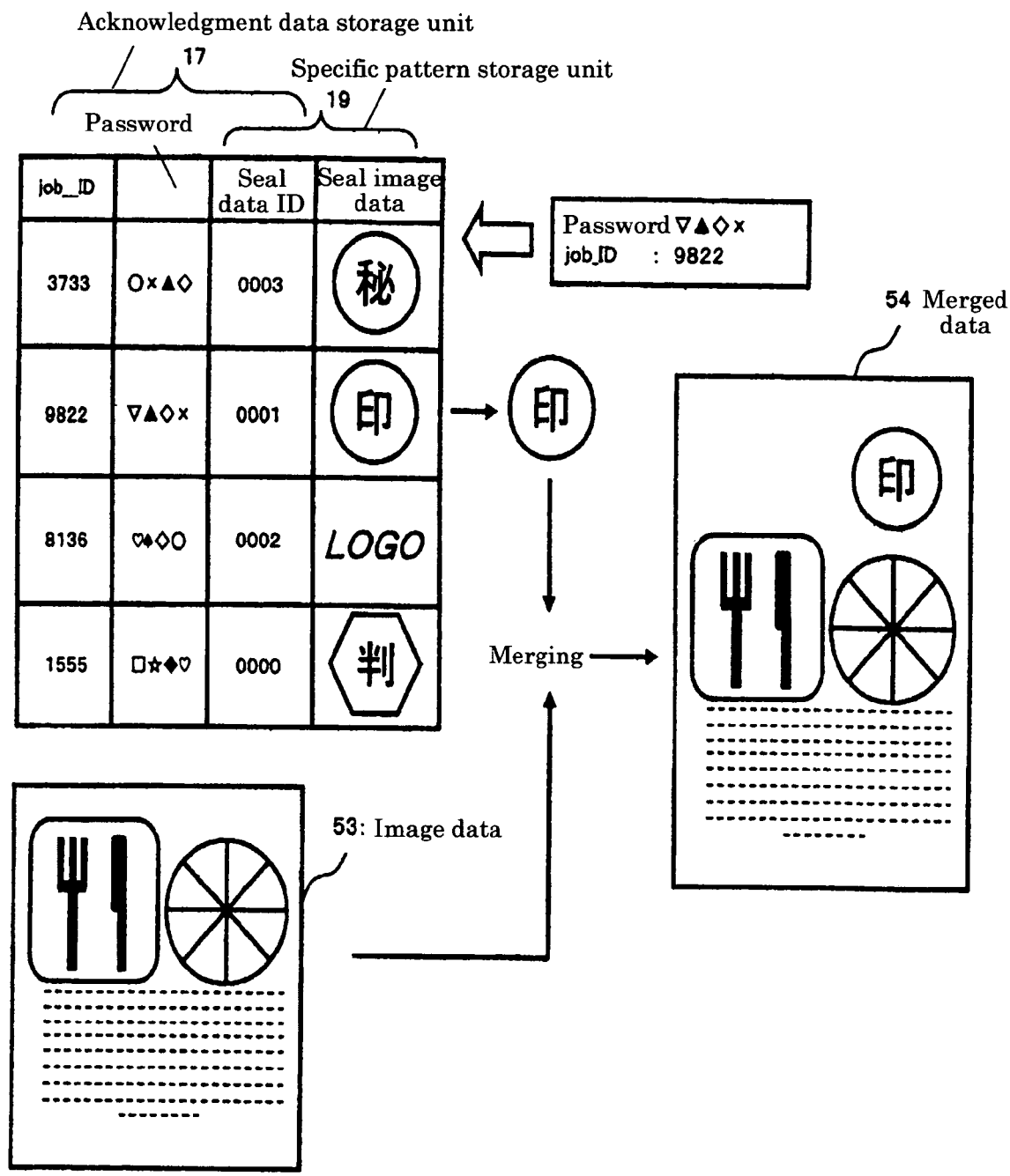
FIG. 10 is a schematic view showing a process of merging the image data and seal image data according to the first embodiment of the present invention.

Through the operations described above, as shown in FIG. 10, the seal data requested for the approval of the merging and printing at the client PC 12 is merged to the image data 53, so that the merged data 54 is printed.

For example, when the job_ID requested for the approval for merging and printing at the client PC 12 is "9822", and the seal data ID approved for the usage is "0001", the image forming apparatus 11 receiving the specific pattern usage approval information 51 stores the information as the acknowledgment data as shown in a second line of the acknowledgment data storage unit 17. Then, the image forming apparatus 11 retrieves the image data 53 and the seal image data corresponding to the seal data ID "0001" from the specific pattern storage unit 19, and merges the image data 53 and the seal image data to create the merged data 54. After the merged data 54 is printed, the data in the second line of the acknowledgment data storage unit 17 corresponding to the job_ID "9822" is deleted.

In the first embodiment, the acknowledger host 13 registers the specific pattern. Alternatively, the specific pattern may be provided in the image forming apparatus 11 in advance, or may be registered with another terminal.

In the first embodiment, the acknowledgment is requested from the client PC 12 in step SS4. Alternatively, information identifying a requester of the acknowledgment may be input for acknowledgment, or biometrics such as finger print and iris may be used. Also, a camera may be provided in the client PC 12 for acknowledging an individual from the acknowledger host 13.

As described above, in the image forming system according to the first embodiment, the seal data is stored in advance, and the acknowledgment data is generated and sent per the acknowledgment in response to a request for approval of usage of the seal data. When the image data is received together with the identification information corresponding to the acknowledgment data, the image data and the seal data are merged and printed. After the image data and the seal data are printed, the acknowledgment data is deleted. Accordingly, it is possible to securely prevent fabrication of the seal data.

Second Embodiment

In an image forming system and an image forming apparatus according to a second embodiment of the present invention, it is possible to register the number of usages of the specific pattern. After the specific pattern is used for the registered number, the acknowledgment data of the specific pattern is discarded.

In the second embodiment, the image forming system has a configuration similar to that in the first embodiment, and explanations of components same as those in first embodiment are omitted.

Figure 11:
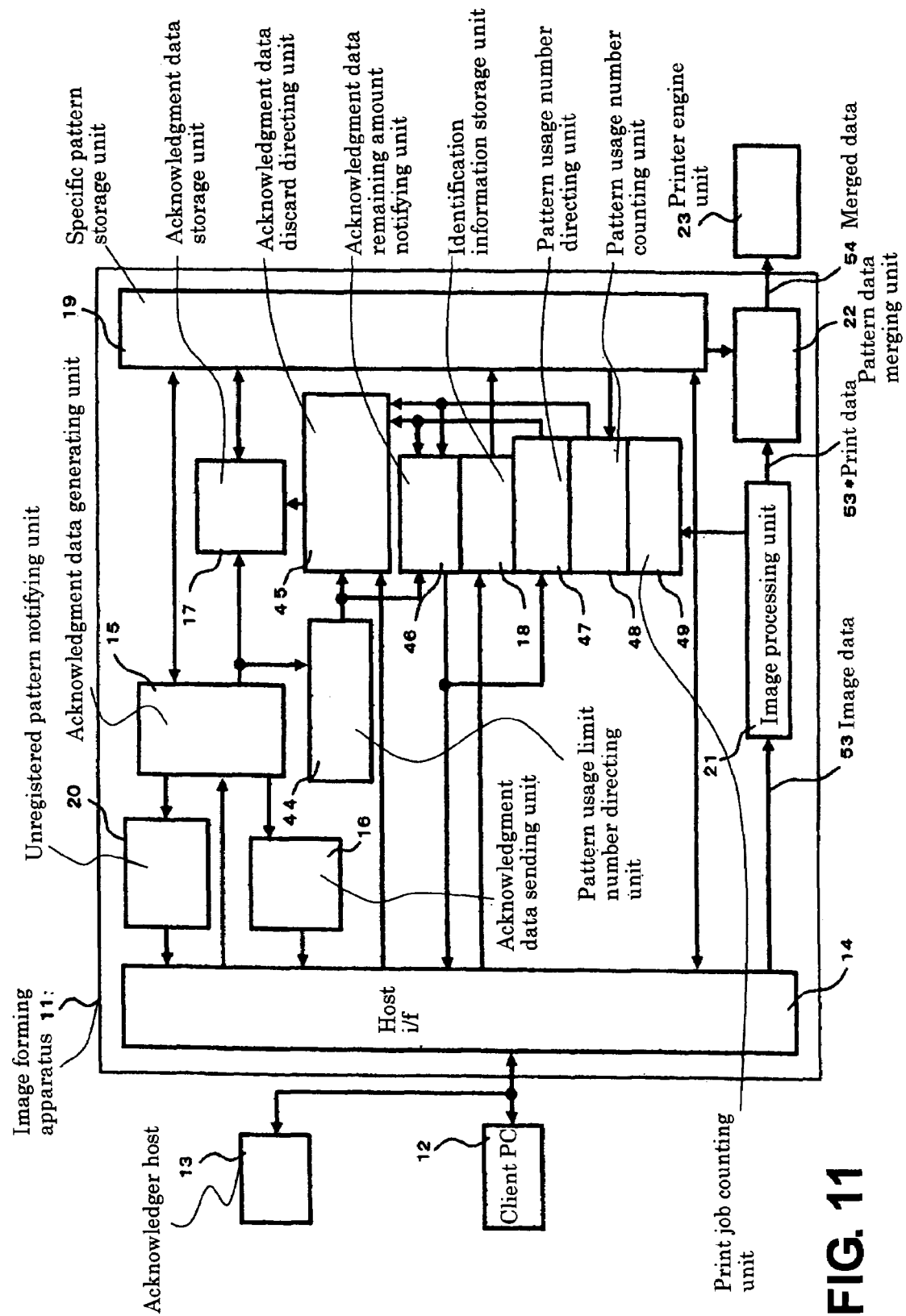
FIG. 11 is a block diagram showing a configuration of an image forming apparatus according to a second embodiment of the present invention.

FIG. 11 is a block diagram showing a configuration of the image forming apparatus according to the second embodiment of the present invention. As shown in FIG. 11, in addition to those in the first embodiment, the image forming apparatus further includes a pattern usage limit number directing unit 44 for storing a pattern usage limit number contained in the specific pattern usage approval information; an acknowledgment data discard directing unit 45 for directing discard of the acknowledgment data stored in the acknowledgment data storage unit 17; an acknowledgment data remaining amount notifying unit 46 for notifying a usable number according to the number of usage of the seal data and the seal data usage limit number; a pattern usage number directing unit 47 for displaying a remaining usage number upon receiving the notification from the acknowledgment data remaining amount notifying unit 46; a pattern usage number counting unit 48 for storing a number of the operations of merging and printing the specific pattern relative to each print job; and a print job counting unit 49 for counting a number of each print job.

Figure 15:
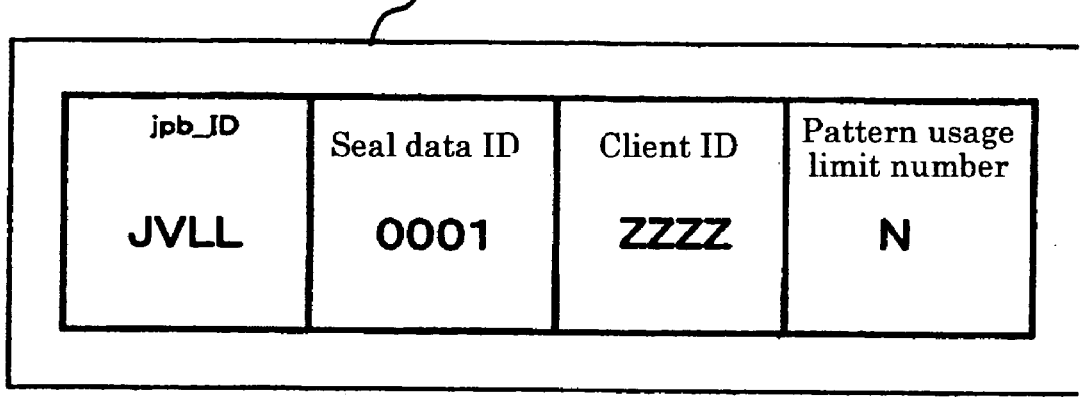
FIG. 15 is a schematic view showing an example of specific pattern usage approval information according to the second embodiment of the present invention.

In the second embodiment, other configuration is the same as that in the first embodiment, and explanation thereof is omitted. FIG. 15 is a schematic view showing an example of specific pattern use approval information 61 according to the second embodiment of the present invention. As shown in FIG. 15, the specific pattern use approval information 61 has a configuration in which the pattern usage limit number is added to the configuration of the specific pattern use approval information 51 in the first embodiment.

Figure 13:
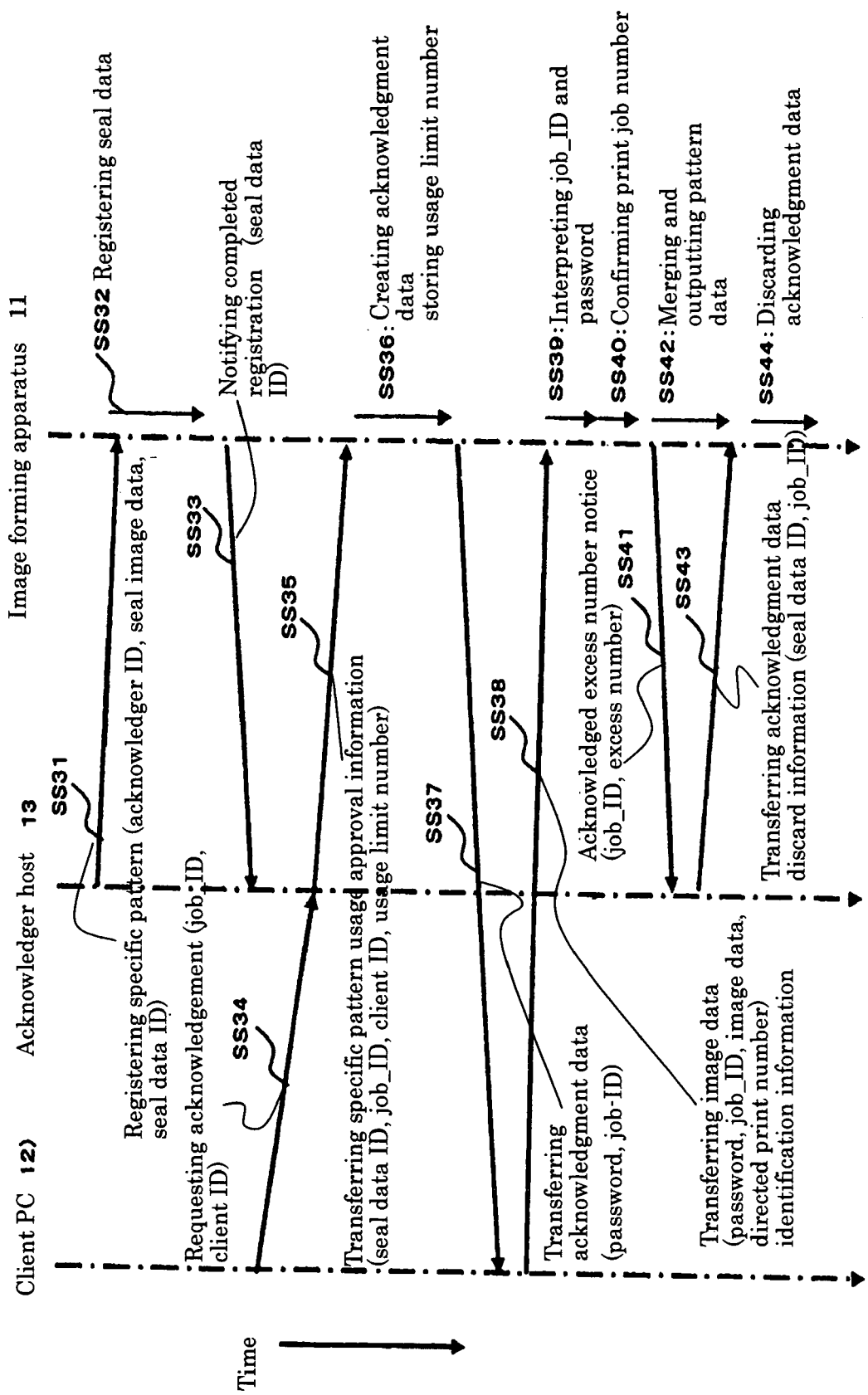
FIG. 13 is a schematic view showing another data flow of the image forming system according to the first embodiment of the present invention.
Figure 14:
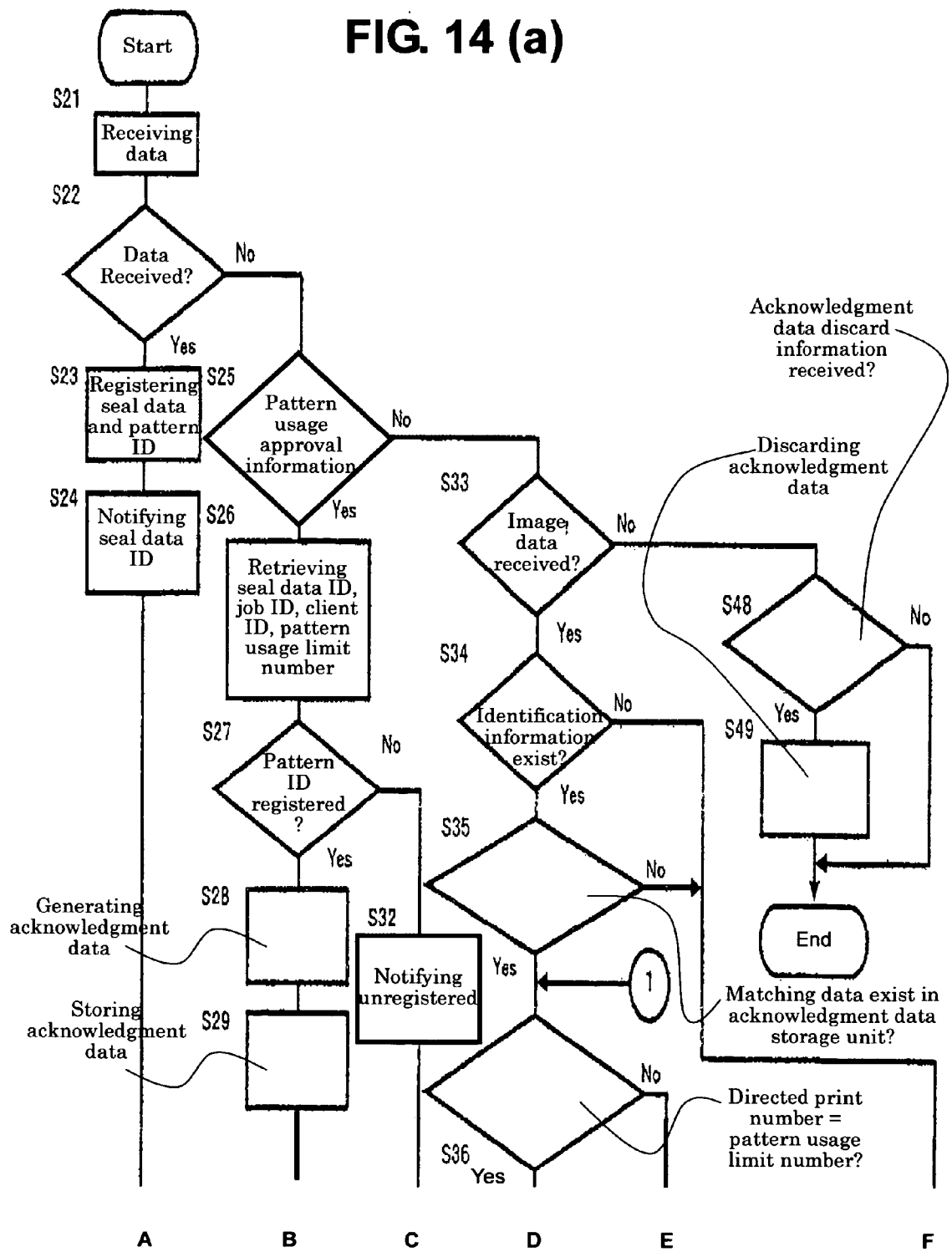
FIGS. 14(a) and 14(b) are flow charts showing an operation of the image forming apparatus according to the second embodiment of the present invention.
Figure 14:
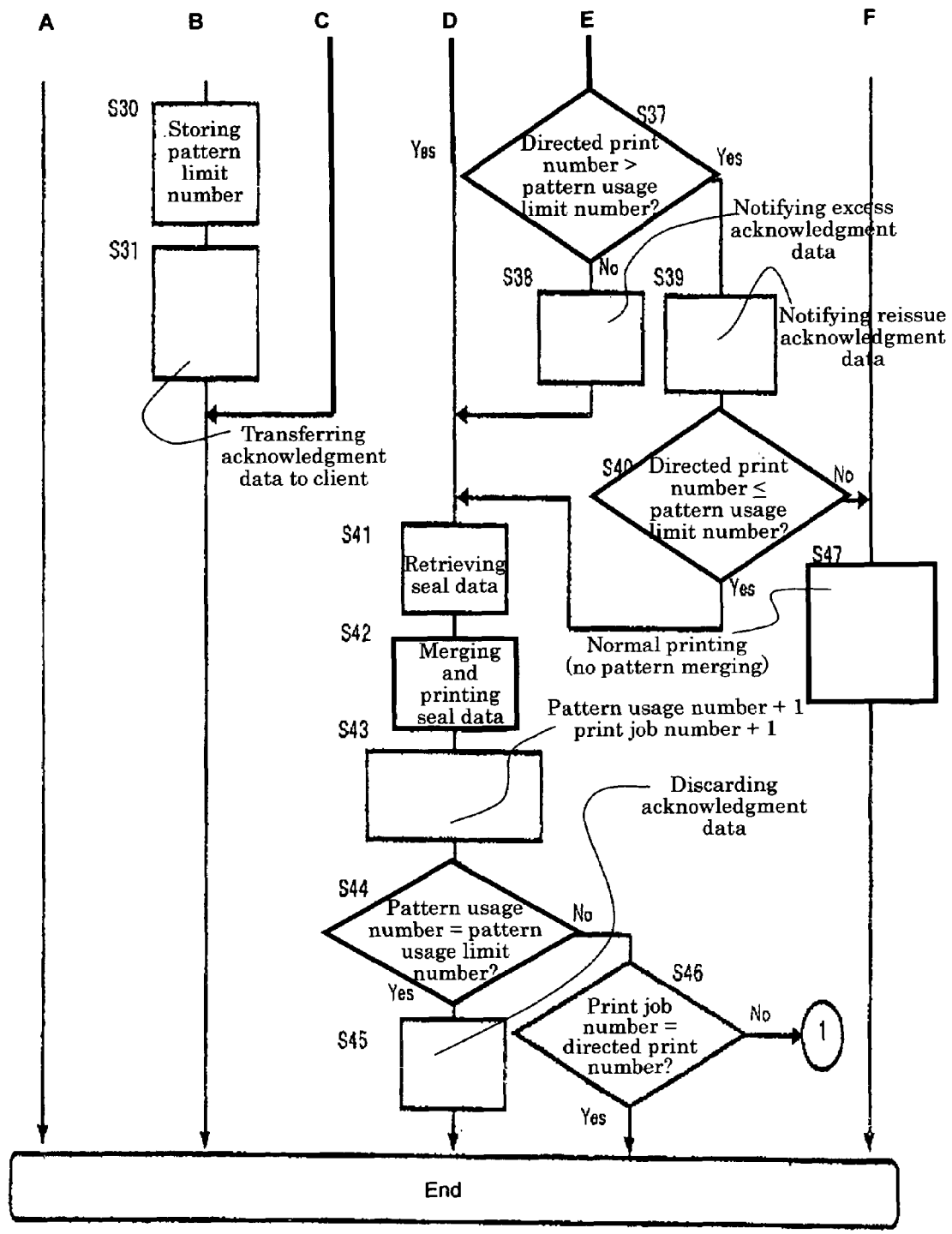

An operation of the image forming system and the image forming apparatus according to the second embodiment of the present invention will be explained next with reference to FIGS. 12, 13 and 14.

First, an operation of the image forming system will be explained. FIG. 12 is a schematic view showing a data flow of the image forming system according to the second embodiment of the present invention. A process from step SS11 to step SS14 is the same as the process from step SS1 to step SS4 of the image forming system in the first embodiment.

That is, in registering the specific pattern in step SS11 to step SS13, the registration of the seal data is directed from the acknowledger host 13 to the image forming apparatus 11. After receiving the direction, the image forming apparatus 11 registers the seal data, and notifies the acknowledger host 13 that the seal data ID and the seal data are registered, thereby completing the operation of registering the specific pattern. In step SS14, the client PC 12 requests the acknowledger host 13 to approve the operation of merging and printing the seal data.

In step SS15, after receiving the acknowledgment request, the acknowledger host 13 sends the specific pattern use approval information 61 to the image forming apparatus 11.

The specific pattern use approval information 61 contains the seal data ID approved for the usage, the job_ID, the client ID, and the pattern usage limit number.

In step SS16, after receiving the specific pattern use approval information 61, the image forming apparatus 11 stores the pattern usage limit number in the pattern usage limit number directing unit 44 to create the acknowledgment data 52. In step SS17, the image forming apparatus 11 sends the acknowledgment data 52 to the client PC 12. As shown in FIG. 8, the acknowledgment data 52 contains the job_ID and the password.

In step SS18, after receiving the acknowledgment data 52, the client PC 12 adds the identification information 52\* to the image data 53, and sends them to the image forming apparatus 11. The identification information 52\* contains a directed print number in addition to the job_ID and the password contained in the acknowledgment data 52 received in step SS17.

In step SS19, after receiving the image data 53 and the identification information 52\*, the image forming apparatus 11 performs authentication based on the job_ID and the password, i.e., the identification information 52\* received. In step SS20, the directed print number is compared with the pattern usage limit number. In Step SS21, when the print job number sent from the client PC 12 exceeds the pattern usage limit number, a reissue notification as a notification of requesting reissue is sent to the acknowledger host 13. The reissue notification contains the job_IP approved for the usage and a deficient number, i.e., the print job number exceeding the pattern usage limit number.

In step SS22, the seal data ID corresponding to the job_ID is retrieved, and the seal image data is retrieved from the seal data registered. While the pattern usage number counting unit 48 and the print job counting unit 49 count the usage number and the print number, within the usage limit number, the image data 53 received is merged and printed. After printing, the data corresponding to the job_ID of the acknowledgment data storage unit 17 is discarded. Afterward, the image forming apparatus 11 waits for the specific pattern use approval information 61 to be sent from the acknowledger host 13.

In step SS23, the remaining print jobs are processed without merging and printing. In step SS24, the acknowledger host 13 receiving the reissue notification sent from the image forming apparatus 11 in step SS21 sends the specific pattern use approval information 61 to the image forming apparatus 11 once again. The specific pattern use approval information 61 contains the seal data ID approved for the usage, the job_ID, the client ID, and the pattern usage limit number approved once again.

In step SS25, after receiving the specific pattern use approval information 61, the image forming apparatus 11 stores the pattern usage limit number in the pattern usage limit number directing unit 44 to create the acknowledgment data 52 once again. In step SS26, the image forming apparatus 11 sends the acknowledgment data 52 to the client PC 12. In step SS27, after receiving the acknowledgment data 52, the client PC 12 adds the identification information 52\* to the image data 53, and sends them to the image forming apparatus 11. The identification information 52\* contains the directed print number in addition to the job_ID and the password contained in the acknowledgment data 52 received in step SS26.

In step SS28, after receiving the image data 53 and the identification information 52\*, the image forming apparatus 11 performs authentication based on the job_ID and the password, i.e., the identification information 52\* received. In step SS29, the print job number and the pattern usage limit number are confirmed. In step SS30, the corresponding seal image data are retrieved. While the pattern usage number counting unit 48 and the print job counting unit 49 count the usage number and the print number, within the usage limit number, the image data 53 received are merged and printed. After printing, the data corresponding to the job_ID of the acknowledgment data storage unit 17 are discarded, thereby completing the process of merging and printing the specific pattern.

In the process described above, the print job number above the pattern limit number is directed. When the print job number below the pattern limit number is directed, the following process is performed. FIG. 13 is a schematic view showing another data flow of the image forming system according to the first embodiment of the present invention.

Figure 12:
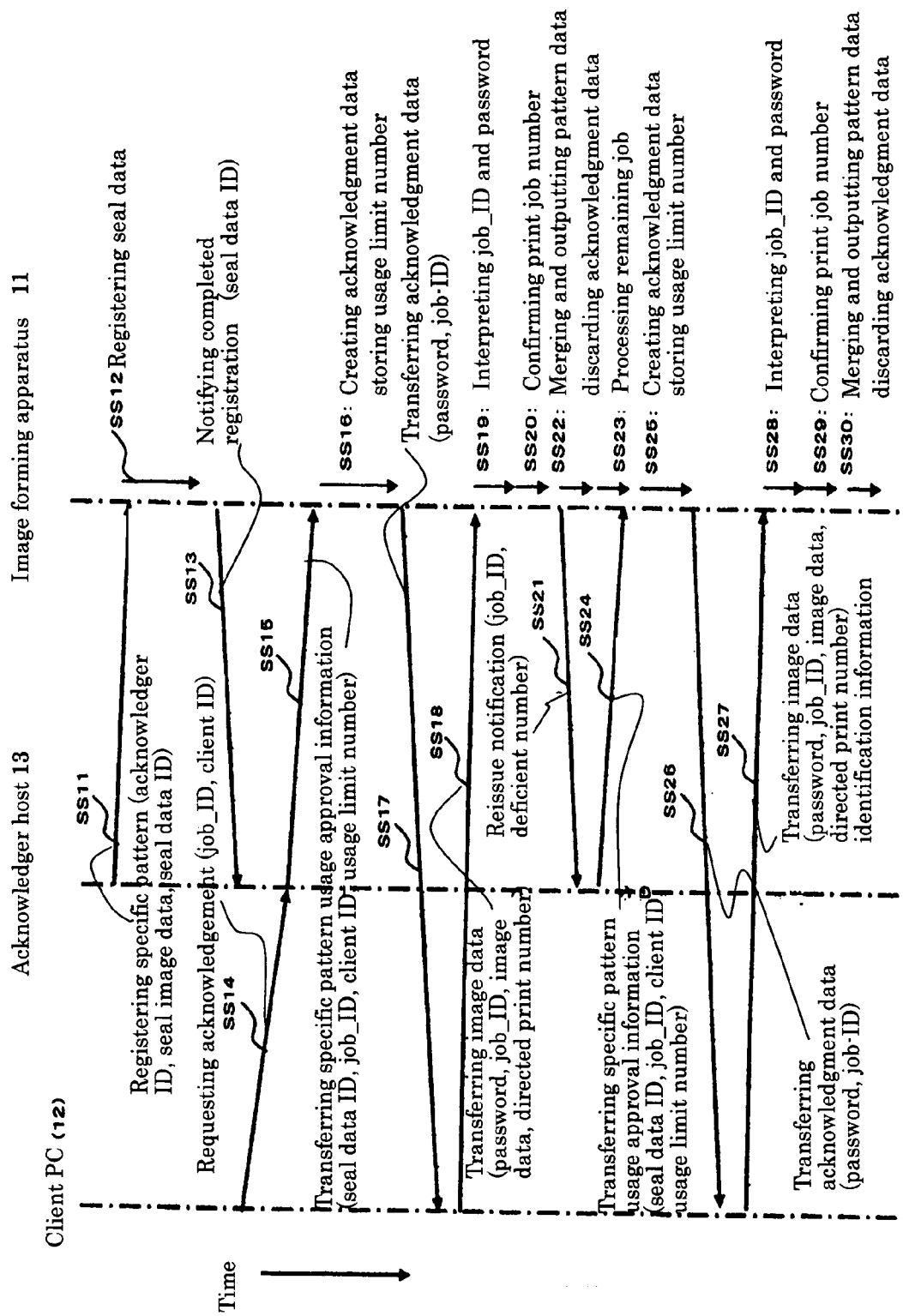
FIG. 12 is a schematic view showing a data flow of an image forming system according to the second embodiment of the present invention.

A process from step SS31 to step SS37 is the same as the process from step SS11 to step SS17 of the process shown in FIG. 12. That is, the seal data is registered according to the direction from the acknowledger host 13. The acknowledgment data is created relative to the usage approval of the seal data sent from the client PC 12 through 13. The acknowledgment data created is sent to the client PC 12. (from step SS31 to step SS37)

After receiving the acknowledgment data 52, the client PC 12 sends the image data 53, the identification information 52\*, and the print job number to the image forming apparatus 11. After receiving them, the image forming apparatus 11 performs authentication based on the job_ID and the password contained in the identification information 52\*, and compares the directed print number and the pattern usage limit number. (from step SS38 to step SS40)

In this case, since the print job number is less than the pattern usage limit number, in step SS41, an acknowledgment number excess notice is sent to the acknowledger host 13. The acknowledgment number excess notice contains the job_ID and a pattern usage excess number.

In step SS42, the seal data ID corresponding to the job_ID is retrieved, and the seal image data are retrieved from the seal data registered. While the pattern usage number counting unit 48 and the print job counting unit 49 count the usage number and the print number, within the usage limit number, the image data 53 received are merged and printed. Afterward, the image forming apparatus 11 waits for acknowledgment data discard information to be sent from the acknowledger host 13.

In this case, additional print direction may be sent. Accordingly, after the merging and printing, the acknowledgment data is not immediately discarded, and the image forming apparatus 11 waits for acknowledgment data discard information to be sent from the acknowledger host 13. Alternatively, after the merging and printing, the corresponding acknowledgment data may be immediately discarded.

In step SS43, the acknowledger host 13 sends the acknowledgment data discard information to the image forming apparatus 11, so that the acknowledgment data stored in the acknowledgment data storage unit 17 is discarded. The acknowledgment data discard information contains the seal data ID and the job_ID. In step SS44, the image forming apparatus 11 discards the acknowledgment data stored in the acknowledgment data storage unit 17, thereby completing the process of merging and printing the specific pattern.

An operation of the image forming apparatus according to the second embodiment of the present invention will be explained next. FIGS. 14(*a*) and 14(*b*) are flow charts showing the operation of the image forming apparatus according to the second embodiment of the present invention.

A process from step S21 to step S24 is the same as the process from step S1 to step S4 of the image forming apparatus in the first embodiment. That is, it is determined whether the data received are the seal data sent from the acknowledger host 13. When the data received are the seal data, the seal data received are stored in the specific pattern storage unit 19, and the specific pattern storage unit 19 notifies the acknowledger host 13 that the seal data are stored. (From step S21 to step S24)

When the data received are not the seal data, it is determined whether the data are the specific pattern use approval information 61 sent from the acknowledger host 13. When the data are the specific pattern use approval information 61 sent from the acknowledger host 13, the acknowledgment data generating unit 15 retrieves the job_ID, the seal data ID, the client ID, and the pattern usage limit number from the specific pattern use approval information 61. (From step S25 to step S26)

It is determined whether the corresponding seal data exist in the specific pattern storage unit 19 from the retrieved seal data. When the corresponding seal data exist, the acknowledgment data generating unit 15 creates the acknowledgment data from the pattern use approval information, and the created acknowledgment data are stored in the acknowledgment data storage unit 17. (From step S27 to step S29)

In step S30, the pattern usage limit number retrieved in step S26 is stored in the pattern usage limit number directing unit 44. In step S31, the acknowledgment data sending unit 16 sends the created acknowledgment data 52 to the client PC 12 according to the retrieved client ID information, thereby completing the process.

When it is determined that the corresponding seal data do not exist in the specific pattern storage unit 19 from the retrieved seal data in step S27, the unregistered pattern notifying unit 20 is notified that the corresponding seal data do not exist, and the unregistered pattern notifying unit 20 notifies the acknowledger host 13 that the pattern is not registered in step S32.

A process from step S33 to step S35 is the same as that from step S12 to step S14 in the first embodiment. That is, it is determined whether the data are the image data 53 sent from the client PC 12. When it is determined that the data are the image data 53, it is determined whether the identification information 52* is added. When it is determined that the identification information 52* is added, the identification information 52* is stored in the identification information storage unit 18, so that the identification information 52* stored in the identification information storage unit 18 is compared with the acknowledgment data stored in the acknowledgment data storage unit 17. (From step S33 to step S35)

In step S36, the acknowledgment data remaining amount notifying unit 46 determines whether the directed print number sent together with the identification information 52* is the same as the pattern usage limit number stored in the pattern usage limit number directing unit 44. When the directed print number is the same as the pattern usage limit number, the process proceeds to step S41.

In step S37, when the directed print number is not the same as the pattern usage limit number, the acknowledgment data remaining amount notifying unit 46 compares the directed print number sent together with the identification information 52* with the pattern usage limit number stored in the pattern usage limit number directing unit 44. In step S39, when the directed print number is greater than the pattern usage limit number, it is necessary to reissue the acknowledgment data 52. Accordingly, the acknowledger host 13 receives acknowledgment data reissue notification indicating that the directed print number is greater than the pattern usage limit number.

In step S40, the acknowledgment data remaining amount notifying unit 46 determines whether the print job number of the print job counting unit 49 is less than the pattern usage limit number. When the print job number is less than the pattern usage limit number, it is possible to merge and print the seal data within the pattern usage limit number. Accordingly, the process proceeds to the step S41, thereby merging and printing the seal data.

When the directed print number is less than the pattern usage limit number in step S37, there is an excess room for printing after printing for the directed print number. Accordingly, in step S38, the acknowledger host 13 receives acknowledgment data excess notification indicating that the directed print number is less than the pattern usage limit number. The process proceeds to step S41, thereby merging and printing the seal data.

A process from step S41 to step S42 is the same as that from step S15 to step S16 in the first embodiment. That is, the seal data of the seal data ID corresponding to the job_ID authenticated in step S35 are retrieved from the specific pattern storage unit 19. Then, the seal data are merged to the image data and converted to the print data, so that the printer engine unit 23 prints the print data.

In step S43, values of the pattern usage number counting unit 48 and the print job counting unit 49 are increased by one increment. In step S44, the acknowledgment data discard directing unit 45 determines whether the pattern usage number reaches the pattern usage limit number. In step S45, when the pattern usage number reaches the pattern usage limit number, the acknowledgment data discard directing unit 45 directs to discard the corresponding acknowledgment data 52, so that the acknowledgment data 52 in the acknowledgment data storage unit 17 is discarded similar to the first embodiment, thereby completing the operation of merging and printing the specific pattern.

When it is determined that the pattern usage number does not reach the pattern usage limit number in step S44, in step S46, it is determined whether the directed print number reaches the print job number. When the directed print number does not reach the print job number, the process returns to step S36. Then, the operation of merging and printing is repeated within the pattern usage limit number. When the directed print number reaches the print job number, the operation of merging and printing is completed.

When it is determined that the identification information 52* is not in the image data 53 in step S34; the matching data are not in the acknowledgment data storage unit in step S35; and the print job number is greater than the pattern usage limit number, the operation of merging and printing the seal data should not be performed. Accordingly, the image processing unit 21 converts the image data 53 received to the print data. The converted image data 53 pass through the pattern data merging unit 22 and are sent to the printer engine unit 23, thereby performing the normal printing without merging in step S47.

When it is determined that the received data are not the image data 53 in step S33, in step S48, it is determined whether the received data are the acknowledgment data discard direction. In step S49, when the received data are the acknowledgment data discard direction, the acknowledgment data discard direction is sent to the acknowledgment data discard directing unit 45. Then, the acknowledgment data discard directing unit 45 directs the acknowledgment data storage unit 17 to discard the corresponding acknowledgment data, so that the acknowledgment data storage unit 17 discards the corresponding acknowledgment data, thereby completing the operation of merging and printing the specific pattern.

When the received data are not the acknowledgment data discard direction in step S48, it is determined that the received data are a direction other than the defining direction, and the operation of merging and printing the specific pattern is completed as is.

As described above, in the image forming system according to the second embodiment of the present invention, it is possible to set the usage number of the specific pattern. When the specific pattern is used for the usage number, the acknowledgment data are discarded. Accordingly, in addition to the effects in the first embodiment, when a plurality of sheets is printed, it is possible to securely control the seal data.

Third Embodiment

According to a third embodiment of the present invention, an image forming system and an image forming apparatus are provided with a pattern usage timing unit, so that the acknowledgment data is discarded when a specific period of time lapses.

In the third embodiment, the image forming system has a configuration similar to that in the first embodiment, and explanations of components same as those in first embodiment are omitted.

Figure 16:
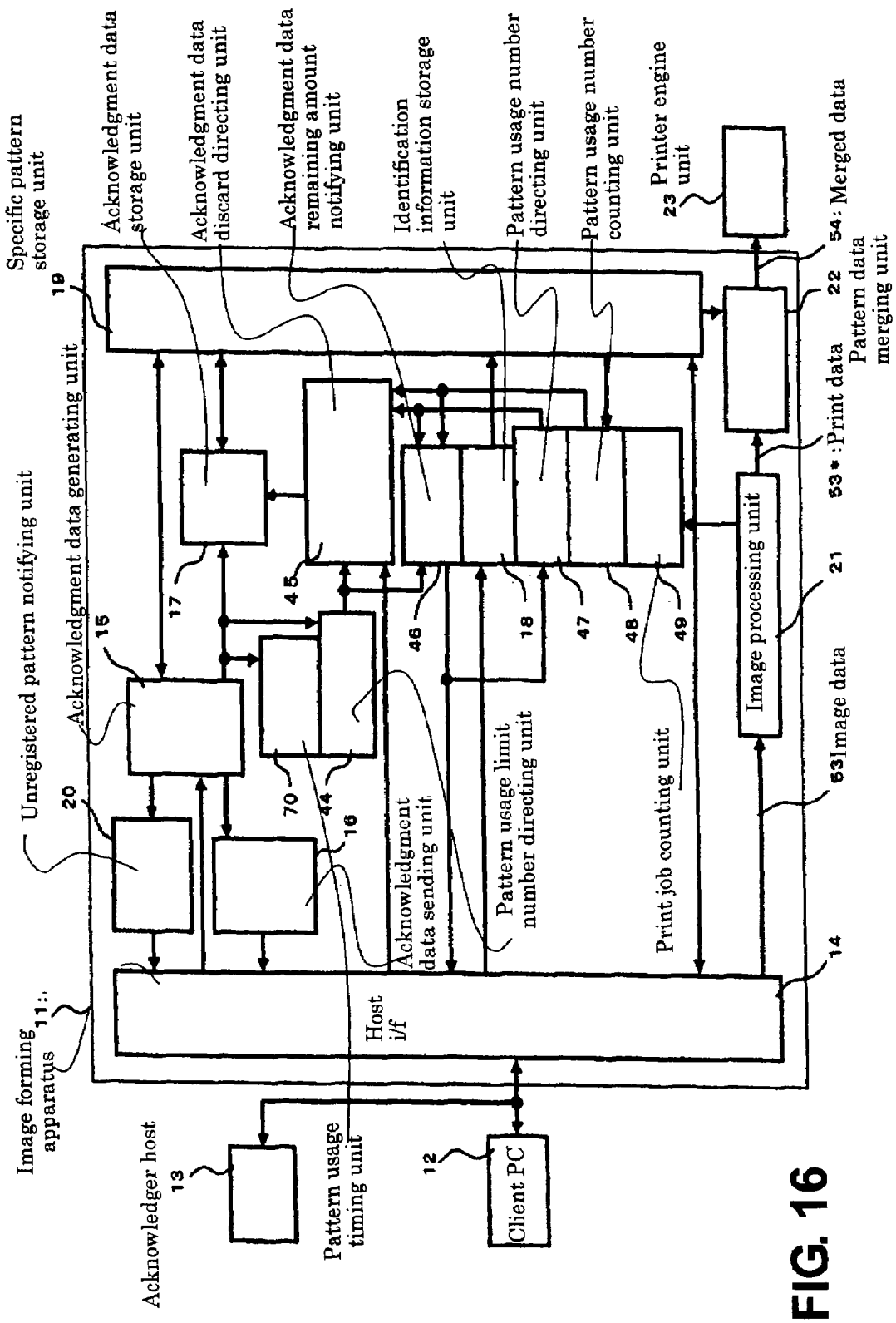
FIG. 16 is a block diagram showing a configuration of an image forming apparatus according to a third embodiment of the present invention.

FIG. 16 is a block diagram showing the configuration of the image forming apparatus according to the third embodiment of the present invention. As shown in FIG. 16, in addition to those of the image forming apparatus in the first embodiment, the image forming apparatus further includes a pattern usage timing unit 70 for measuring a period of lapse time from when the acknowledgment data generating unit 15 creates the acknowledgment data 52.

Figure 17:
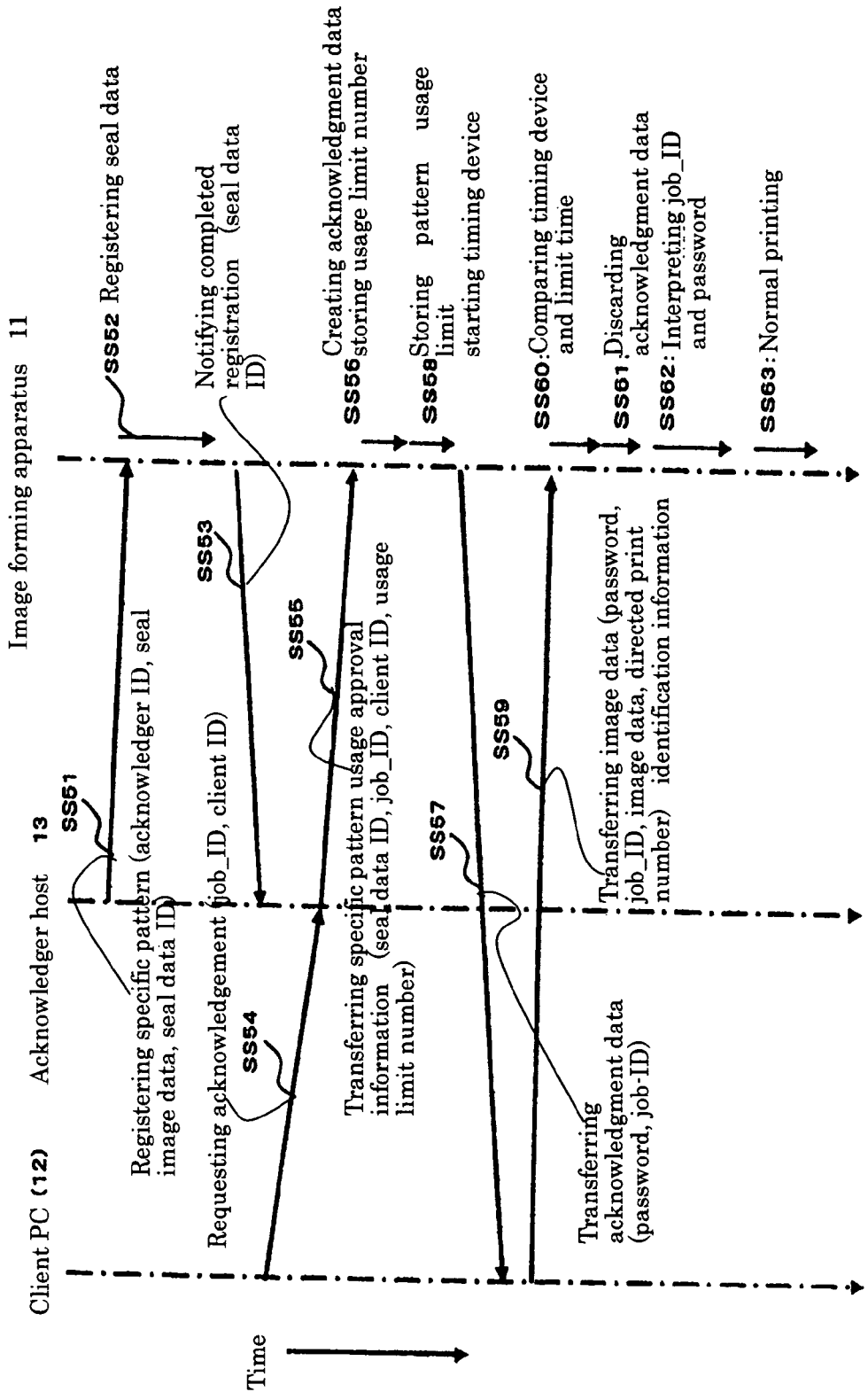
FIG. 17 is a schematic view showing a data flow of an image forming system according to the third embodiment of the present invention.
Figure 18:
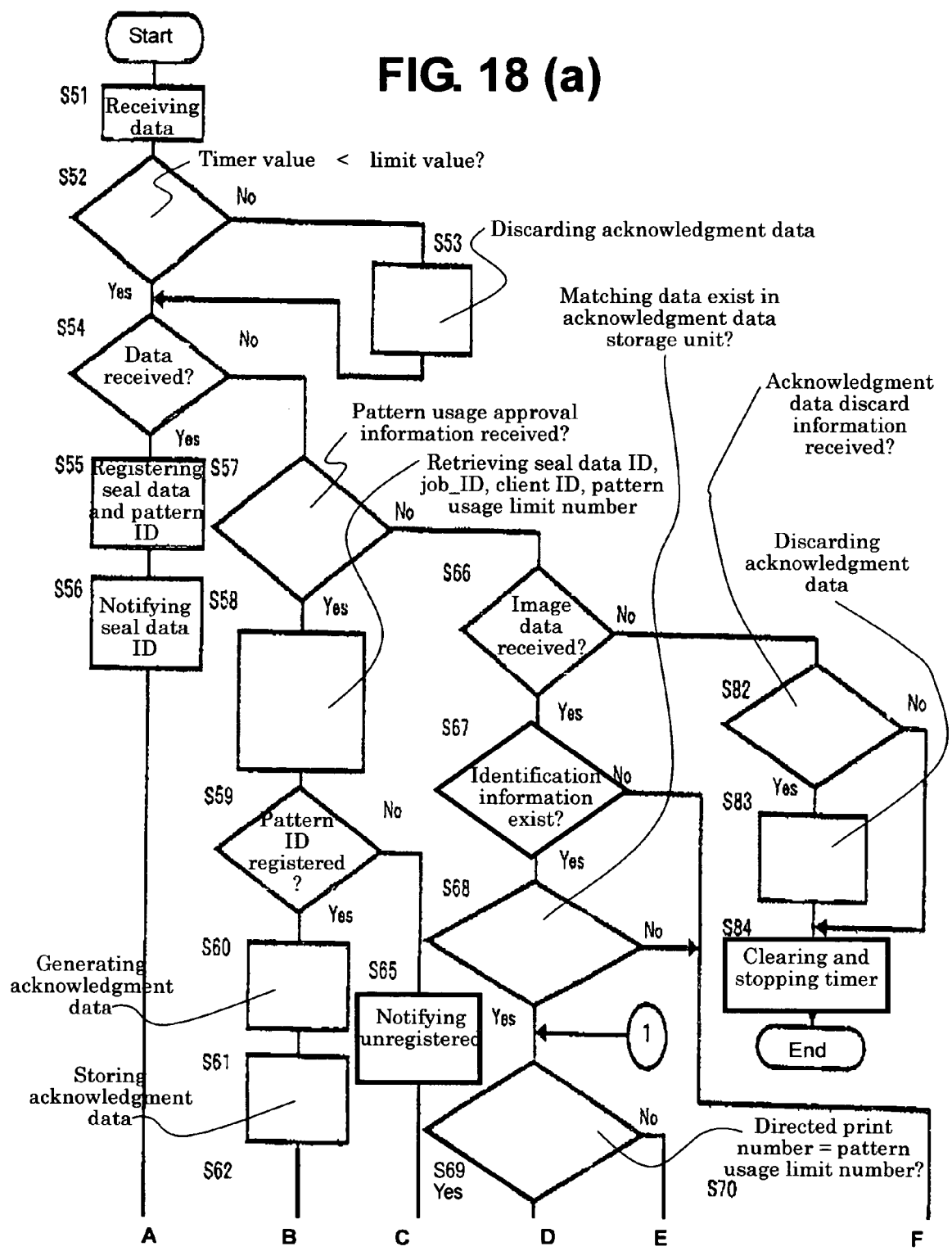
FIGS. 18(a) and 18(b) are flow charts showing an operation of the image forming apparatus according to the third embodiment of the present invention.
Figure 18:
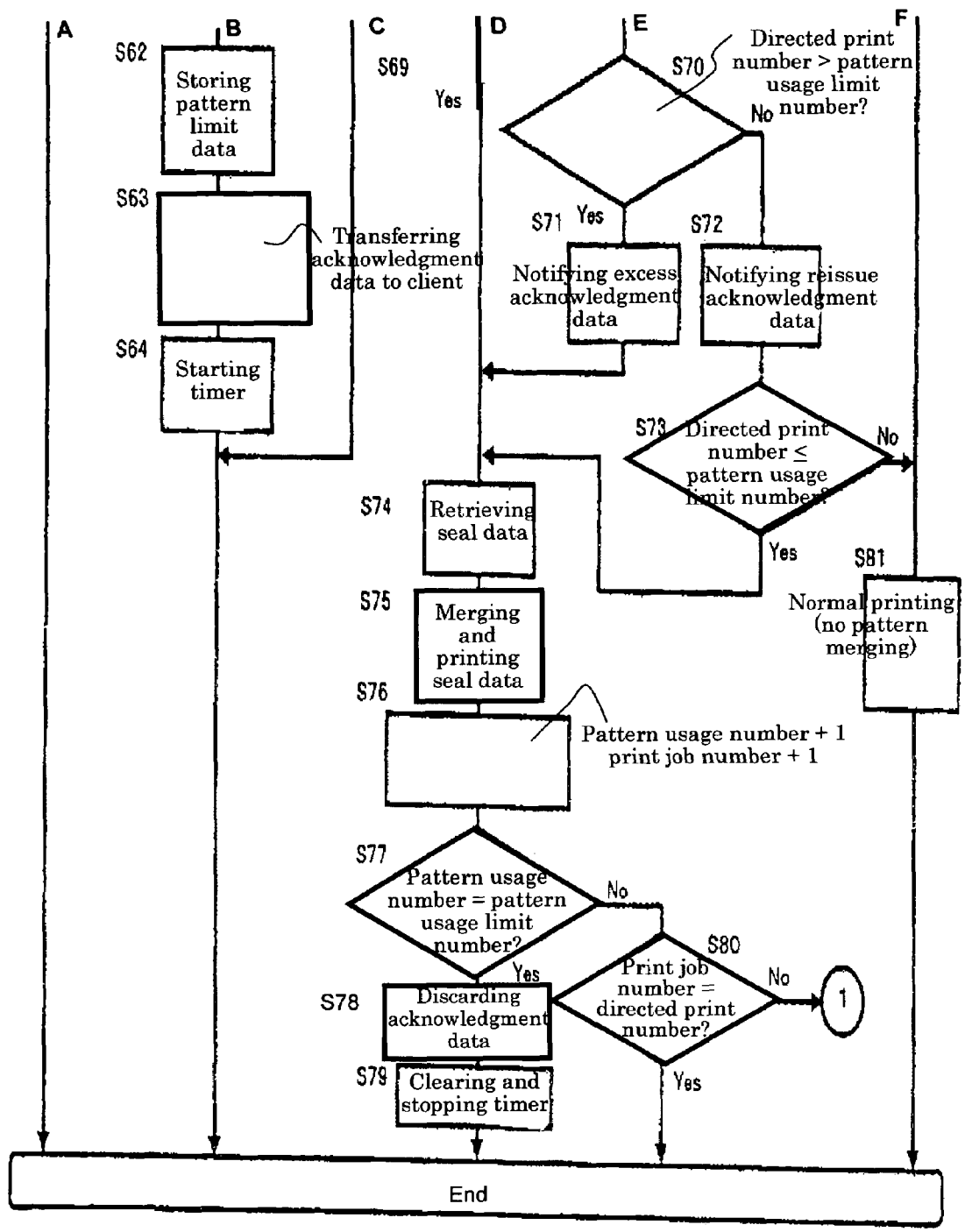

An operation of the image forming system and the image forming apparatus according to the third embodiment of the present invention will be explained next with reference to FIGS. 17 and 18.

First, an operation of the image forming system will be explained. FIG. 17 is a schematic view showing a data flow of the image forming system according to the third embodiment of the present invention. The data flow shows a case that when the image data 53 is received, the lapse time from when the acknowledgment data 52 is created exceeds an acknowledgment data usage limit time.

Similar to the process from step SS11 to step SS17 of the image forming system in the second embodiment, through a process of registering the seal data (from step SS51 to step SS53) and a process of requesting acknowledgment from the client PC 12 through the acknowledger host 13, the acknowledgment data 52 is created, and the operation of transferring to the client PC 12 is performed. (From step SS54 to step SS57) In step SS58, the image forming apparatus 11 stores a pattern usage limit, and starts the pattern usage timing unit 70.

In step SS59, after receiving the acknowledgment data 52, the client PC 12 adds the identification information 52* to the image data 53 similar to the second embodiment, and sends them to the image forming apparatus 11. In step SS60, the image forming apparatus 11 compares a value of the pattern usage timing unit 70 with the pattern usage limit. In step SS61, when it is determined that the value of the pattern usage timing unit 70 exceeds the pattern usage limit, the corresponding acknowledgment data 52 is discarded. In step SS62, the image forming apparatus 11 performs authentication based on the job_ID and the password, i.e., the identification information 52* received. In step SS63, the normal printing is performed.

With reference to FIGS. 18(a) and 18(b), an operation of the image forming apparatus according to the third embodiment of the present invention will be explained next. FIGS. 18(a) and 18(b) are flow charts showing the operation of the image forming apparatus according to the third embodiment of the present invention.

In step S51, it is determined whether the data received is the seal data sent from the acknowledger host 13. In step S52, it is determined whether the value of the pattern usage timing unit 70 exceeds the pattern usage limit. In step S53, when it is determined that the value of the pattern usage timing unit 70 exceeds the pattern usage limit, the acknowledgment data discard directing unit 45 is notified that the value of the pattern usage timing unit 70 exceeds the pattern usage limit, and the corresponding acknowledgment data in the acknowledgment data storage unit 17 is discarded.

When it is determined that the value of the pattern usage timing unit 70 does not exceed the pattern usage limit in step S52, the process proceeds to step S54. In the process from step S54 to step S56, similar to that from step S22 to step S24 in the second embodiment, the registration process of the seal data is performed.

In a process from step S57 to step S63, similar to that from step S25 to step S31 in the second embodiment, the acknowledgment data 52 is created and stored based on the specific pattern use approval information 61 from the acknowledger host 13; the acknowledgment data 52 is sent to the client PC 12; and the pattern usage limit is stored.

In step S64, the acknowledgment data generating unit 15 notifies the pattern usage timing unit 70 that the acknowledgment data is created, so that the pattern usage timing unit 70 starts upon receiving the notice. When it is determined that the seal data corresponding to the seal data ID does not exist in step S59, step S65 similar to step S32 in the second embodiment is performed.

In a process from step S66 to step S68, similar to that from step S33 to step S46 in the second embodiment, the acknowledgment data stored in step S61 is compared with the identification information 52* added to the acknowledgment data 52 received for authentication. From step S69 to step S78 and step S80, the operation of merging and printing is performed within the pattern usage limit number; the acknowledgment data excess notification or the acknowledgment data reissue notification is sent through the comparison of the directed print number and the pattern usage limit number; and the acknowledgment data 52 is discarded when the usage number of the seal data reaches the pattern usage limit number.

In step S79, the value of the pattern usage timing unit 70 is cleared to zero, thereby completing the operation of merging and printing the specific pattern.

In the process from step S81 to step S83, similar to that from step S47 to step S49 in the second embodiment, when it is determined that the identification information 52* is not in the image data 53 in step S67; the matching data is not in the acknowledgment data storage unit 117 in step S68; and the directed print number is greater than the pattern usage limit number, the operation of merging and printing the seal data should not be performed. Accordingly, the printer engine unit 23 performs the normal printing without the operation of merging and printing.

In step S83, when the received data is the acknowledgment data discard direction, the corresponding acknowledgment data is discarded. From step S82 to step S84, the value of the pattern usage timing unit 70 is cleared to zero, thereby completing the operation of merging and printing the specific pattern. When the received data is not the acknowledgment data discard direction, the operation of merging and printing the specific pattern is completed as is.

As described above, in the image forming system according to the third embodiment of the present invention, the image forming apparatus is provided with the pattern usage timing unit. Even when the usage number of the seal data is less than the usage limit number, after the specific period time, it is considered as unauthorized usage, thereby discarding the acknowledgment data. Accordingly, it is possible to securely prevent unauthorized usage of the seal data.

Fourth Embodiment

According to a fourth embodiment of the present invention, an image forming system and an image forming apparatus are provided with a paper jam detection unit and a usage approval information reissue request unit. When a paper jam occurs during the operation of merging and printing, the paper jam is detected. Then, it is requested to reissue the specific pattern usage approval information, so that the acknowledgment data is created once more relative to the reissue.

In the fourth embodiment, the image forming system has a configuration similar to that in the first embodiment shown in FIG. 1, and explanations of components same as those in first embodiment are omitted.

Figure 19:
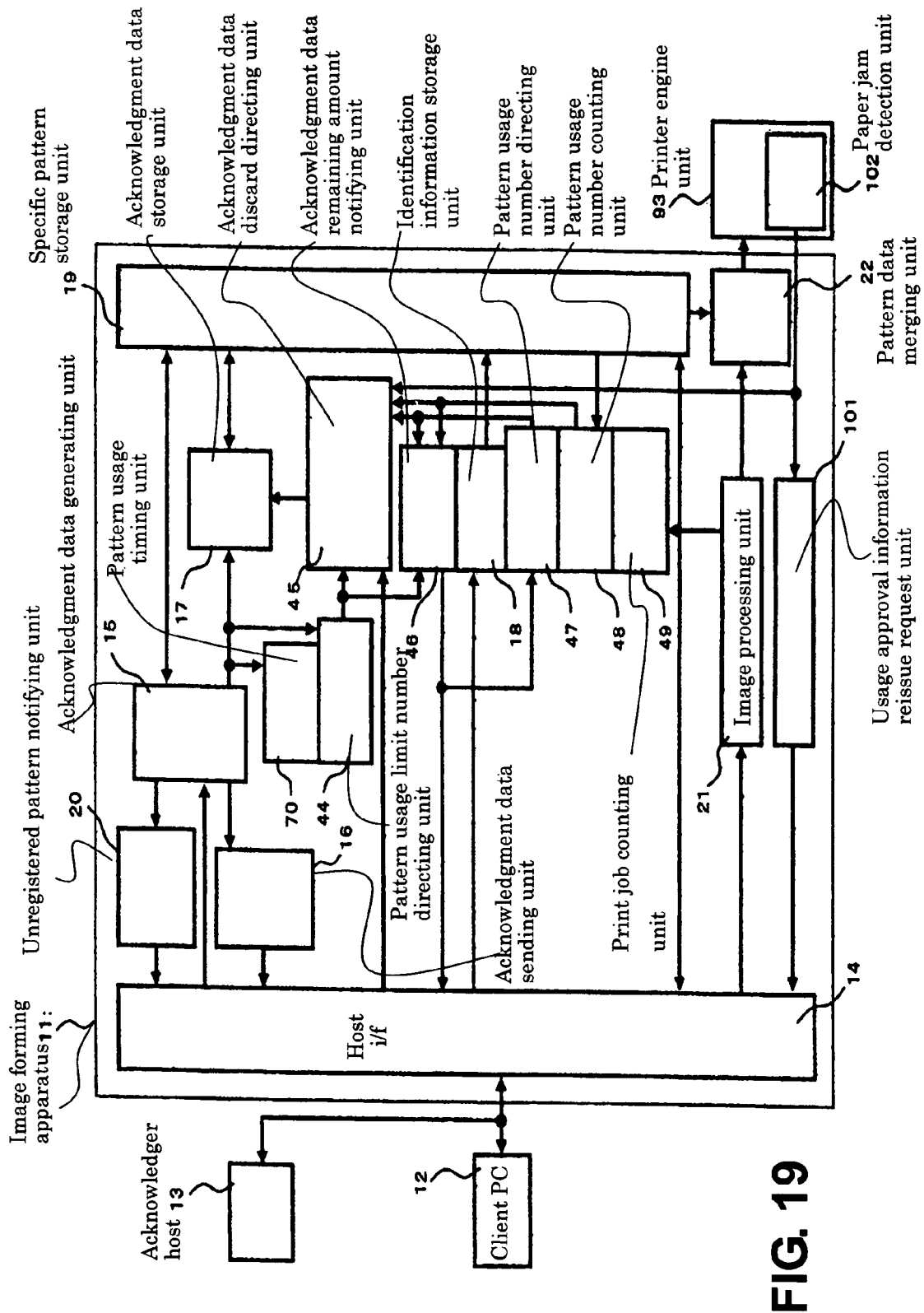
FIG. 19 is a block diagram showing a configuration of an image forming apparatus according to a fourth embodiment of the present invention.

FIG. 19 is a block diagram showing a configuration of the image forming apparatus according to the fourth embodiment of the present invention. As shown in FIG. 19, in addition to those in the third embodiment, the image forming apparatus includes a usage approval information reissue request unit 101 (at a lower center portion in FIG. 19); and a paper jam detection unit 102 (at a upper right portion in FIG. 19) in a printer engine unit 93. In the fourth embodiment, other configuration is the same as that of the image forming apparatus in the third embodiment, and explanation thereof is omitted.

In the embodiment, the paper jam detection unit 102 detects that a medium is jammed in a transport path during the operation of merging and printing the specific pattern and the image data, and may detect a paper jam in a normal printing operation. In detecting a paper jam, for example, it is determined that a paper jam occurs when a medium is not transported within a specific period of time.

When a paper jam is detected, a paper jam notice is sent to the usage approval information reissue request unit 101, so that the usage approval information reissue request unit 101 sends the paper jam notice to the client PC 12 and the acknowledger host 13 through the host i/f 14.

Figure 20:
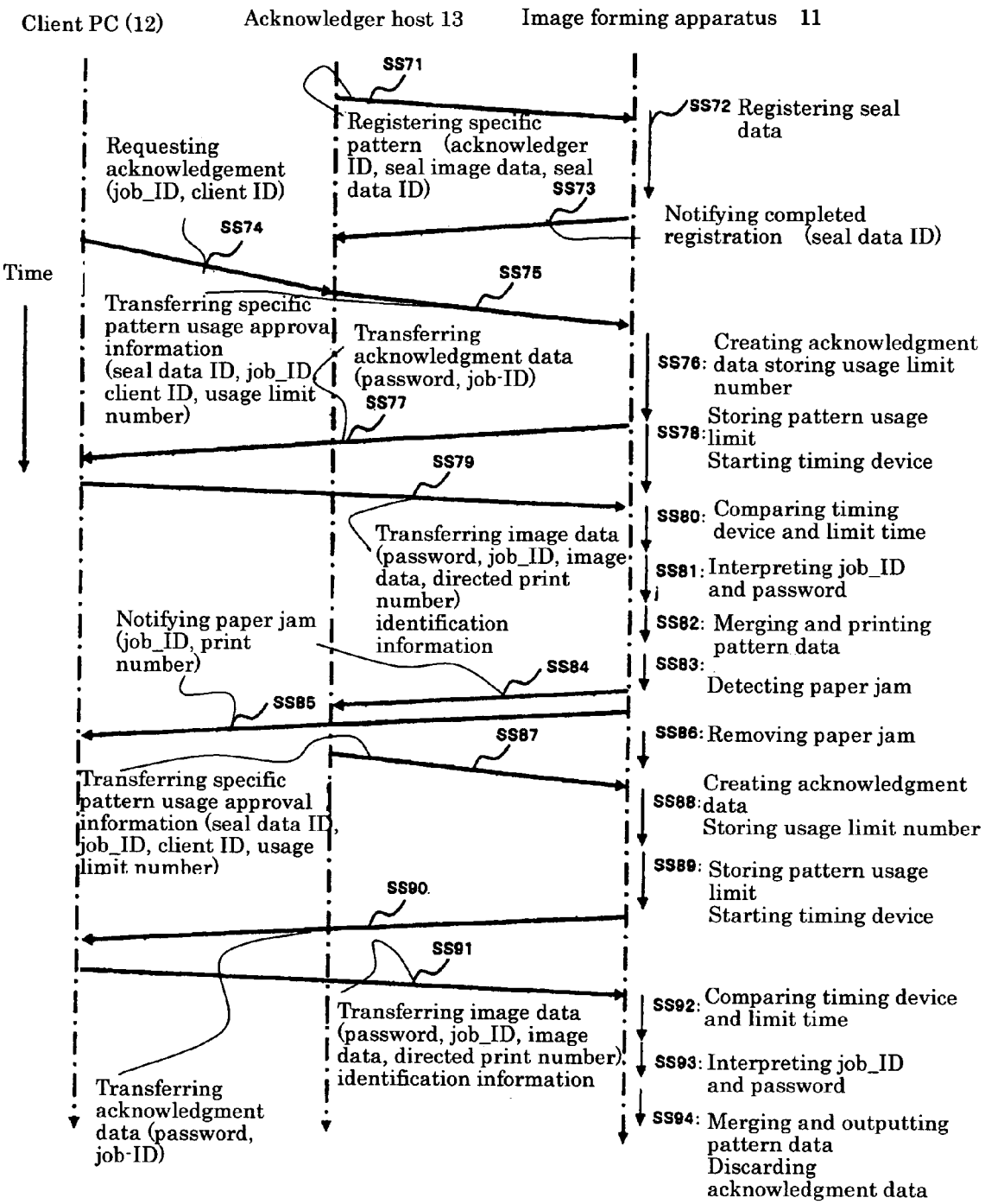
FIG. 20 is a schematic view showing a data flow of an image forming system according to the fourth embodiment of the present invention.
Figure 21:
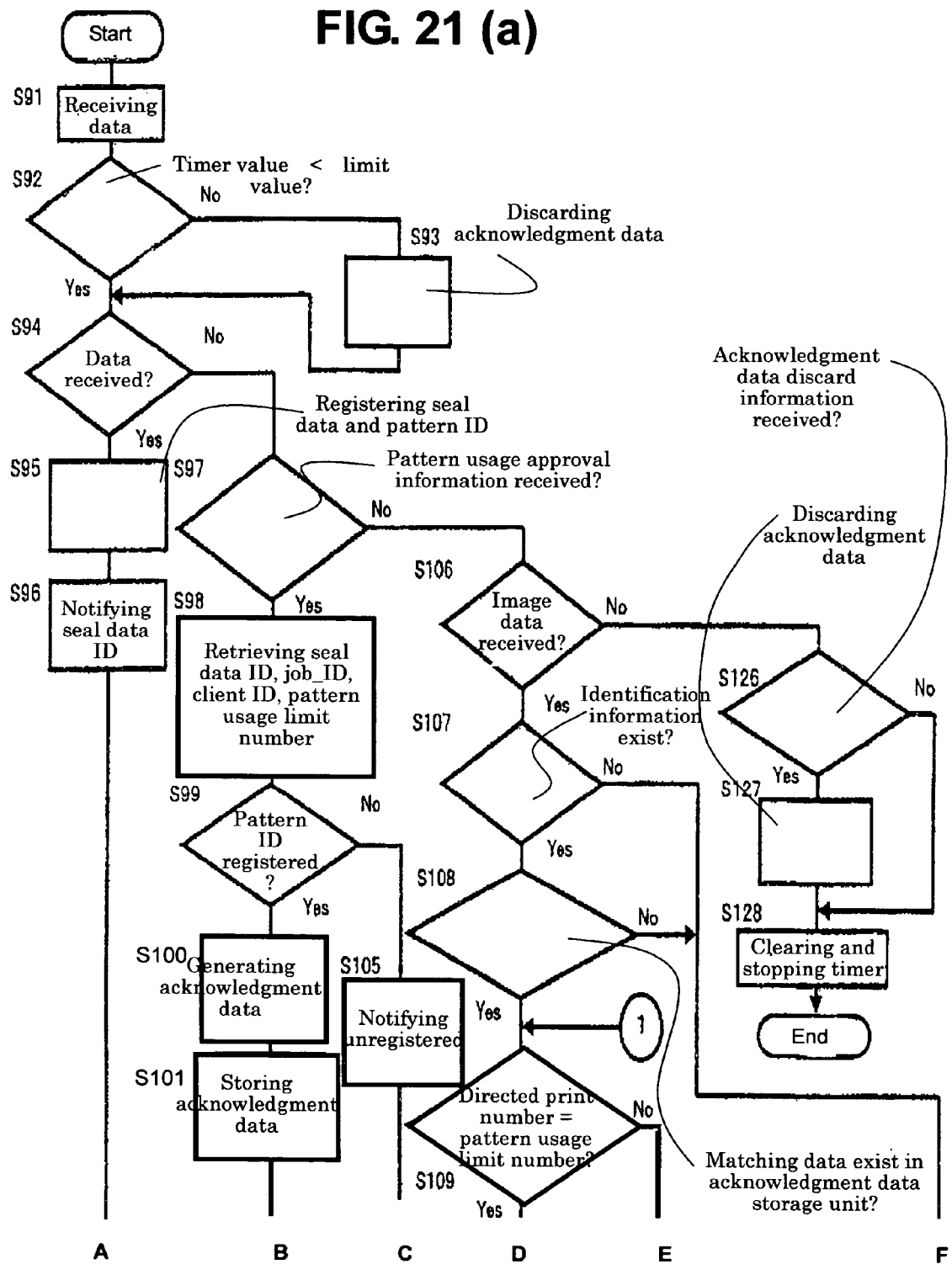
FIGS. 21(a) and 21(b) are flow charts showing an operation of the image forming apparatus according to the fourth embodiment of the present invention.
Figure 21:
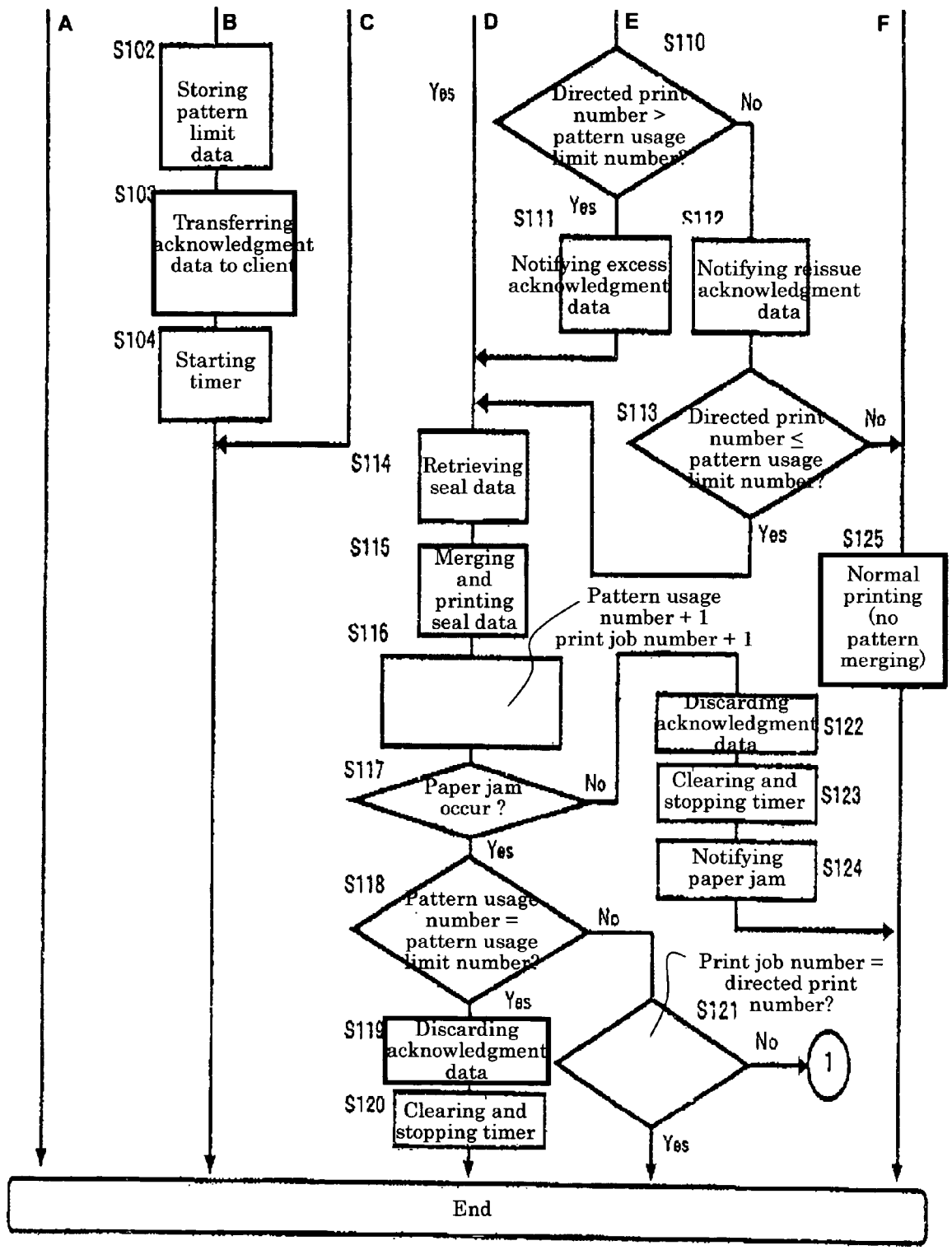

An operation of the image forming system and the image forming apparatus according to the fourth embodiment of the present invention will be explained next with reference to FIGS. 20 and 21.

First, an operation of the image forming system will be explained. FIG. 20 is a schematic view showing a data flow of the image forming system according to the fourth embodiment of the present invention. Similar to the process from step SS51 to step SS60 in the third embodiment, through a process of registering the seal data (from step SS71 to step SS73) and a process of requesting acknowledgment from the client PC 12 through the acknowledger host 13, the acknowledgment data 52 is created, and the operation of transferring to the client PC 12 is performed, so that the pattern usage limit is stored and the pattern usage timing unit 70 is started. (From step SS74 to step SS78)

After receiving the acknowledgment data 52, the client PC 12 adds the identification information 52* to the image data 53 similar to the second embodiment, and sends them to the image forming apparatus 11. After receiving them, the image forming apparatus 11 confirms it is within the pattern usage limit. After authentication, the corresponding seal data and the image data 53 are merged and printed. (From step SS79 to step SS82)

At this moment, in step S83, the paper jam detection unit 102 in the printer engine unit 93 determines whether a paper jam occurs. When it is determined that the paper jam occurs, the paper jam notice is sent to the usage approval information reissue request unit 101, so that the usage approval information reissue request unit 101 notifies the client PC 12 and the acknowledger host 13 through the host i/f 14 that the paper jam occurs and the operation of merging and printing the seal data is not completed. (From step SS84 to step SS85)

In step SS86, the paper jam in the printer engine unit 93 is removed. The paper jam may be removed automatically or manually, so that the stoppage state due to the paper jam is returned to the normal state, thereby making it possible to receive reissue of the specific pattern use approval information 61 (described later).

Similar to the process from step SS74 to step SS78, after receiving the usage approval information from the acknowledger host 13 one more time, the acknowledgment data 52 is created, and the operation of transferring to the client PC 12 is performed, so that the pattern usage limit is stored and the pattern usage timing unit 70 is started. (From step SS87 to step SS89)

After receiving the acknowledgment data 52, the client PC 12 adds the identification information 52* to the image data 53 similar to the second embodiment, and sends them to the image forming apparatus 11. After receiving them, the image forming apparatus 11 confirms it is within the pattern usage limit. After authentication, the corresponding seal data and the image data 53 are merged and printed, and the corresponding acknowledgment data is discarded, thereby completing the process of merging and printing the specific pattern. (From step SS79 to step SS82)

An operation of the image forming apparatus according to the fourth embodiment of the present invention will be explained next with reference to the flow charts shown in FIGS. 21(a) and 21(b).

Similar to the process from step S51 to step S76 in the third embodiment, after receiving the data, it is confirmed within the pattern usage limit, and the operation of registering the seal data is performed. (From step S91 to step S96)

In a process from step S97 to step S104, similar to that from step S57 to step S64 in the third embodiment, the acknowledgment data 52 is created and stored based on the specific pattern use approval information 61 from the acknowledger host 13; the acknowledgment data 52 is sent to the client PC 12; the pattern usage limit is stored; and the pattern usage timing unit 70 is started. When the seal data corresponding to the seal data ID does not exist in step S99, similar to step S65 in the third embodiment, the unregistered pattern notifying unit 20 is notified that the corresponding seal data does not exist, and the unregistered pattern notifying unit 20 notifies the acknowledger host 13 that the pattern is not registered.

In a process from step S106 to step S116, similar to that from step S66 to step S76 in the third embodiment, the acknowledgment data stored in step S101 is compared with the identification information 52* added to the acknowledgment data 52 received for authentication. Then, the acknowledgment data excess notification or the acknowledgment data reissue notification is sent through the comparison of the directed print number and the pattern usage limit number; and the operation of merging and printing is performed within the pattern usage limit number.

In step S117, the paper jam detection unit 102 in the printer engine unit 93 determines whether a paper jam occurs. When it is determined that the paper jam does not occur, it is determined whether the pattern usage number reaches the pattern usage limit number. When the pattern usage number reaches the pattern usage limit number, the corresponding acknowledgment data 52 in the acknowledgment data storage unit 17 is discarded, and the value of the pattern usage timing unit 70 is cleared to zero, thereby completing the process of merging and printing the specific pattern. (From step S108 to step S120)

When the pattern usage number does not reach the pattern usage limit number, in step S121, it is determined whether the directed print number reaches the print job number. When the directed print number does not reach the print job number, the process returns to step S109, thereby repeating the process of merging and printing the specific pattern within the pattern usage limit number. When the directed print number reaches the print job number, the process of merging and printing the specific pattern is completed.

When it is determined that the paper jam occurs in step S117, the paper jam detection unit 102 notifies the acknowledgment data discard directing unit 45 that the paper jam occurs. Upon receiving the notice, the acknowledgment data discard directing unit 45 discards the corresponding acknowledgment data 52 in the acknowledgment data storage unit 17, and the value of the pattern usage timing unit 70 is cleared to zero. Further, the usage approval information reissue request unit 101 notifies the client PC 12 and the acknowledger host 13 through the host i/f 14 that the paper jam occurs, and requests issue of the acknowledgment data, thereby completing the operation of merging and printing the seal data. (From step S122 to step S124)

In step S125, similar to step S81 in the third embodiment, when it is not acknowledged with the identification information 52*; the matching data is not in the acknowledgment data storage unit 117 in step S68; and the directed print number is greater than the pattern usage limit number, the operation of merging and printing the seal data should not be performed. Accordingly, the printer engine unit 23 performs the normal printing without the operation of merging and printing.

Similar to the process from step S82 to step S84 in the third embodiment, it is determined whether the received data is the acknowledgment data discard direction, and the value of the pattern usage timing unit 70 is cleared to zero, thereby completing the operation of merging and printing the specific pattern. (From step S126 to step S128)

As described above, in the image forming system and the image forming apparatus according to the fourth embodiment of the present invention, the paper jam detection unit and the usage approval information reissue request unit are provided. When a paper jam occurs during the operation of merging and printing, the paper jam is detected. Then, it is requested to reissue the specific pattern usage approval information, so that the acknowledgment data is created once more relative to the reissue. Accordingly, even when the paper jam occurs, it is possible to securely prevent unauthorized usage of the seal data.

Fifth Embodiment

In an image forming system and an image forming apparatus according to a fifth embodiment of the present invention, it is possible to merge and print a specific pattern acknowledged by a plurality of acknowledgers and arbitrary image data.

Figure 22:
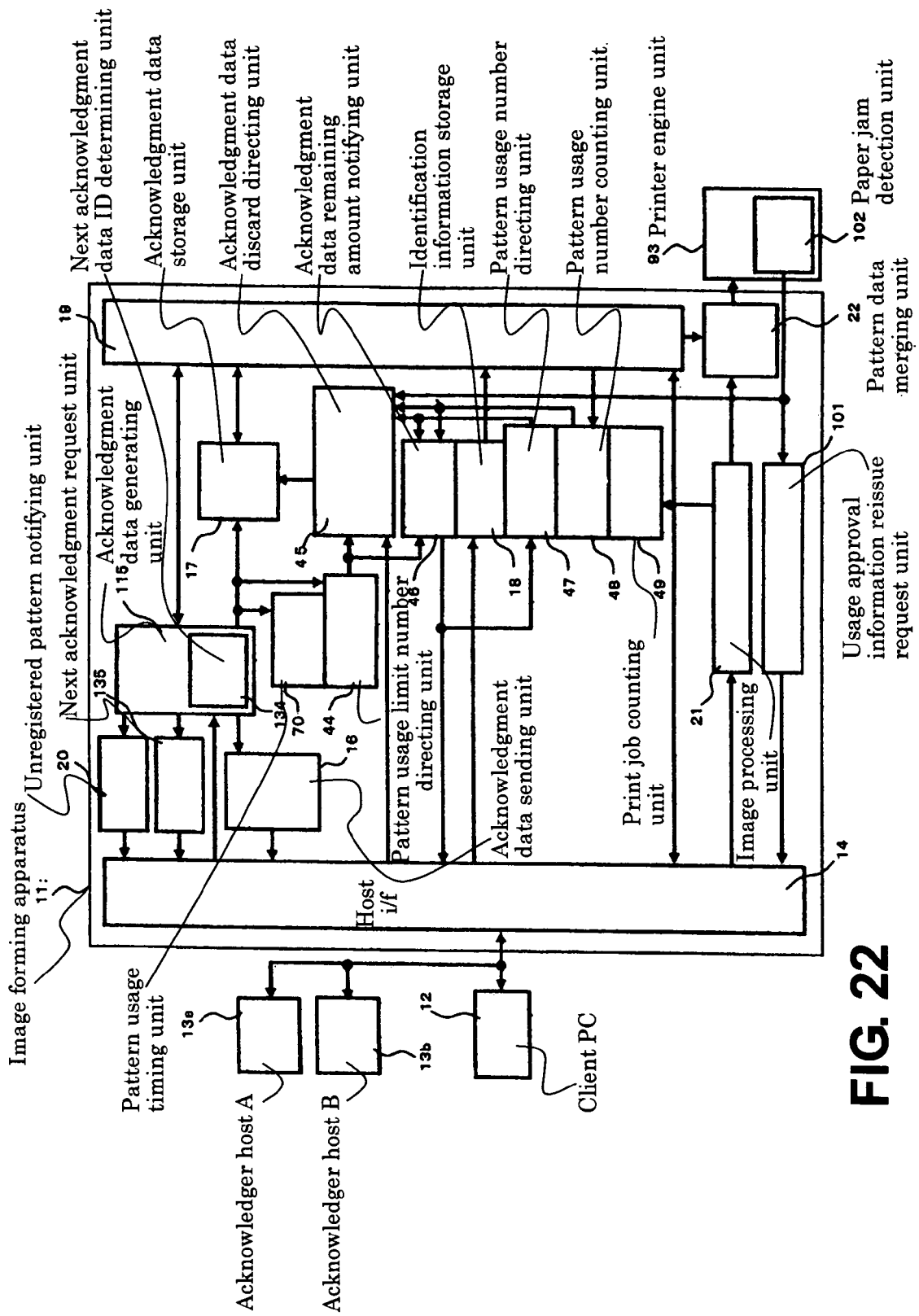
FIG. 22 is a block diagram showing a configuration of an image forming apparatus according to a fifth embodiment of the present invention.

FIG. 22 is a block diagram showing a configuration of the image forming system and the image forming apparatus according to the fifth embodiment of the present invention. As shown in FIG. 22, in addition to the image forming system in the fourth embodiment, the image forming system further includes an acknowledger host B 13*b*. Further, in addition to the image forming apparatus in the fourth embodiment, the image forming apparatus 11 includes a next acknowledgment data ID determining unit 134 (at a upper left portion in FIG. 22) in the acknowledgment data generating unit 15, and a next acknowledgment request unit 135 (at a left side thereof in FIG. 22). In the fifth embodiment, other configuration is the same as that of the image forming apparatus in the fourth embodiment, and explanation thereof is omitted.

In the embodiment, the next acknowledgment data ID determining unit 134 determines that a next acknowledger ID exists when the next acknowledger ID representing a host to be acknowledged next is contained in the specific pattern usage approval information, and notifies the next acknowledgment request unit 135 that the next acknowledger ID exists. Upon receiving the notice that the next acknowledger ID exists, the next acknowledgment request unit 135 requests the acknowledger host 13 corresponding to the next acknowledger ID to send the specific pattern usage approval information.

FIGS. 25(*a*) and 25(*b*) are schematic views showing examples of the specific pattern usage approval information of the acknowledger host A 13*a* and the acknowledger host B 13*b*, respectively. As shown in FIGS. 25(*a*) and 25(*b*), an area is provided for storing the next acknowledger ID. In the specific pattern usage approval information of the acknowledger host A 13*a*, "N" is assigned in the next acknowledger ID. In the specific pattern usage approval information of the acknowledger host B 13*b*, nothing is assigned in the next acknowledger ID.

Figure 26:
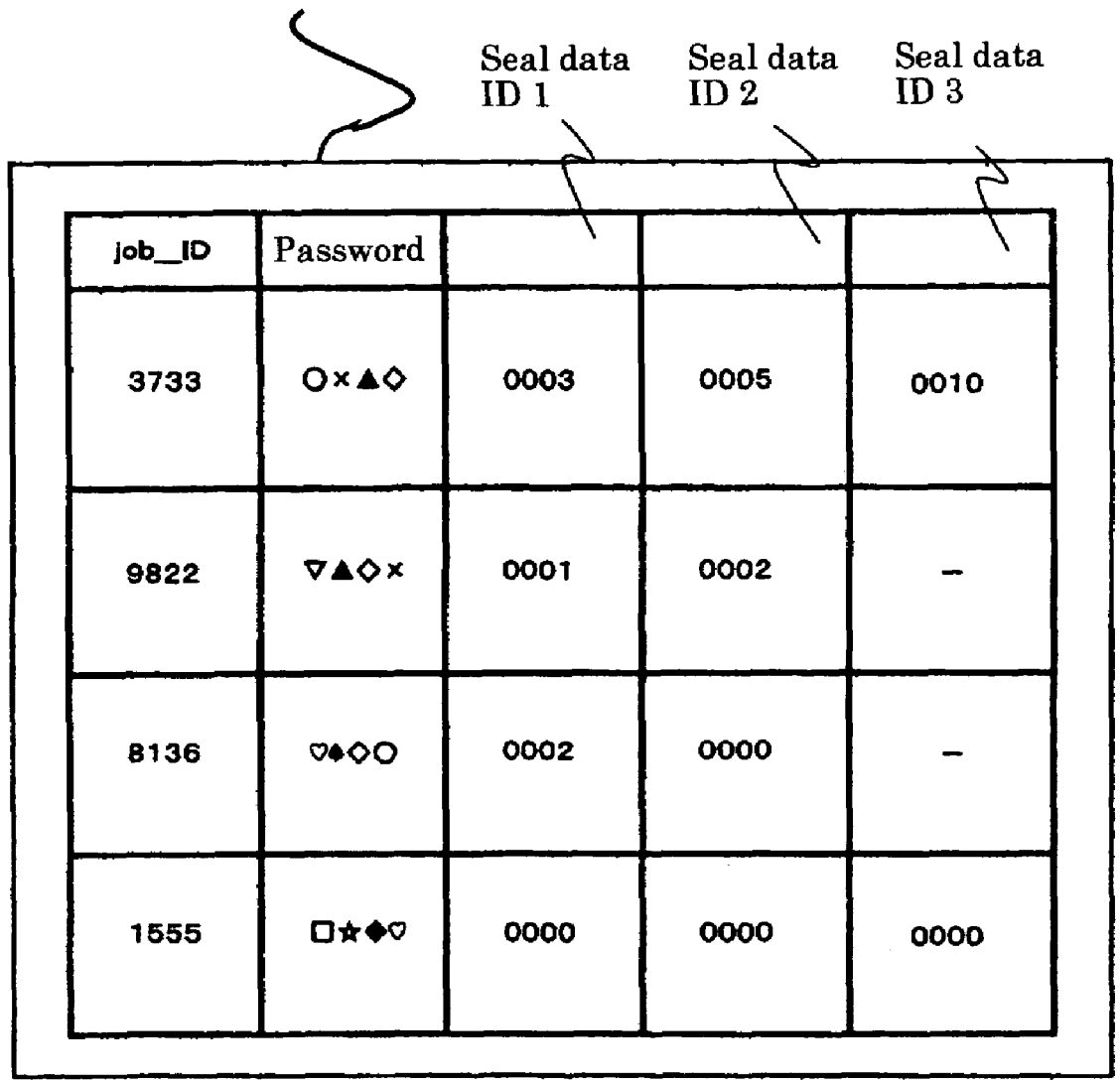
FIG. 26 is a schematic view showing a configuration of an acknowledgment data storage unit according to the fifth embodiment of the present invention.

FIG. 26 is a schematic view showing a configuration of an acknowledgment data storage unit 117 according to the fifth embodiment of the present invention. As shown in FIG. 26, the acknowledgment data storage unit 117 stores the passwords corresponding to the job_IDs; and a seal data ID 1, a seal data ID 2, and a seal data ID 3 per the acknowledger host. For example, when the job-ID is "9822", the password is "∇▲◇×"; the seal data ID 1 is "001"; the seal data ID 2 is "0001"; and the seal data ID 3 is not assigned.

Figure 27:
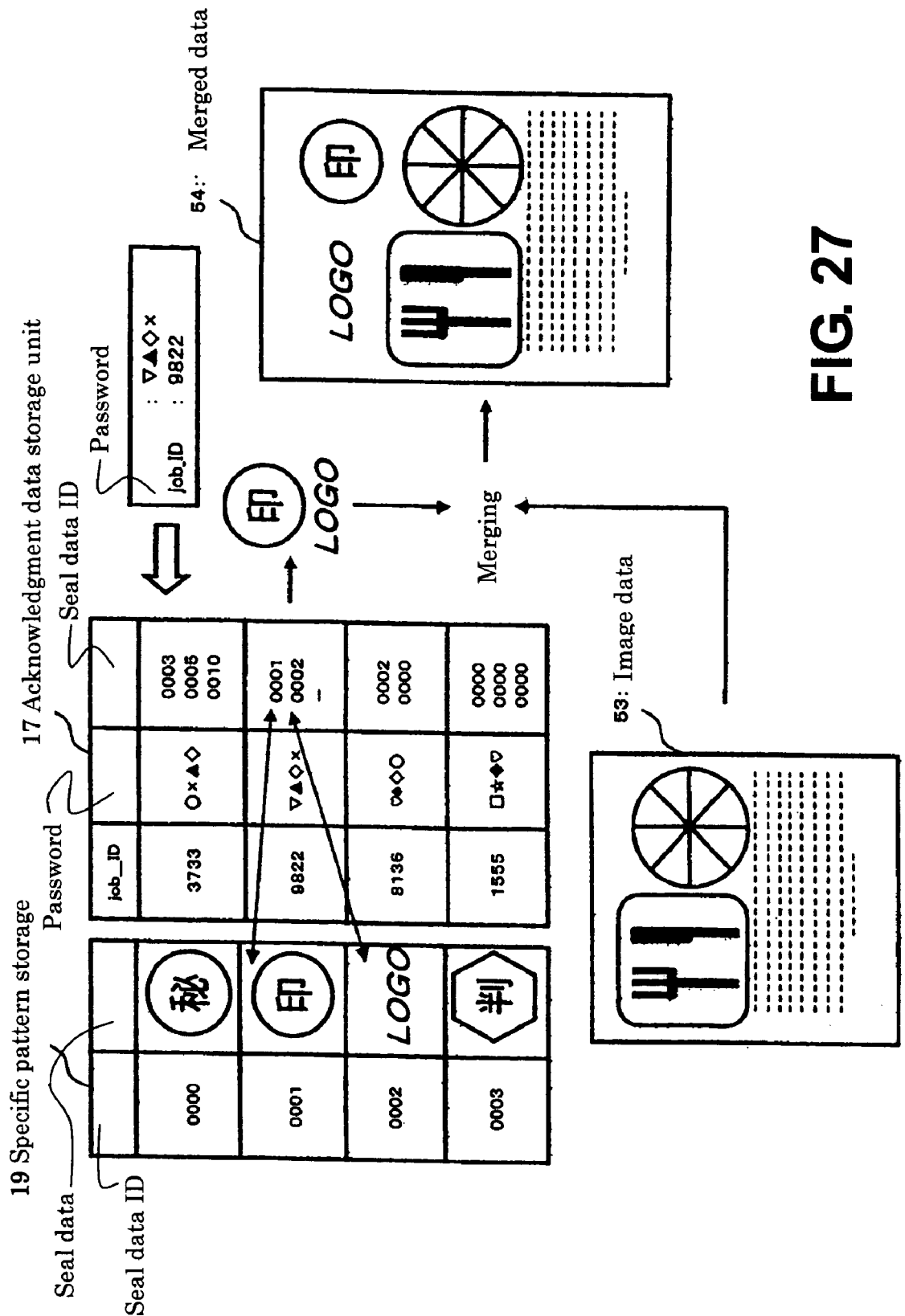
FIG. 27 is a schematic view showing a process of merging image data and seal image data according to the fifth embodiment of the present invention.

FIG. 27 is a schematic view showing a process of merging and printing the seal data from two acknowledger hosts with the image forming system according to the fifth embodiment of the present invention.

Figure 23:
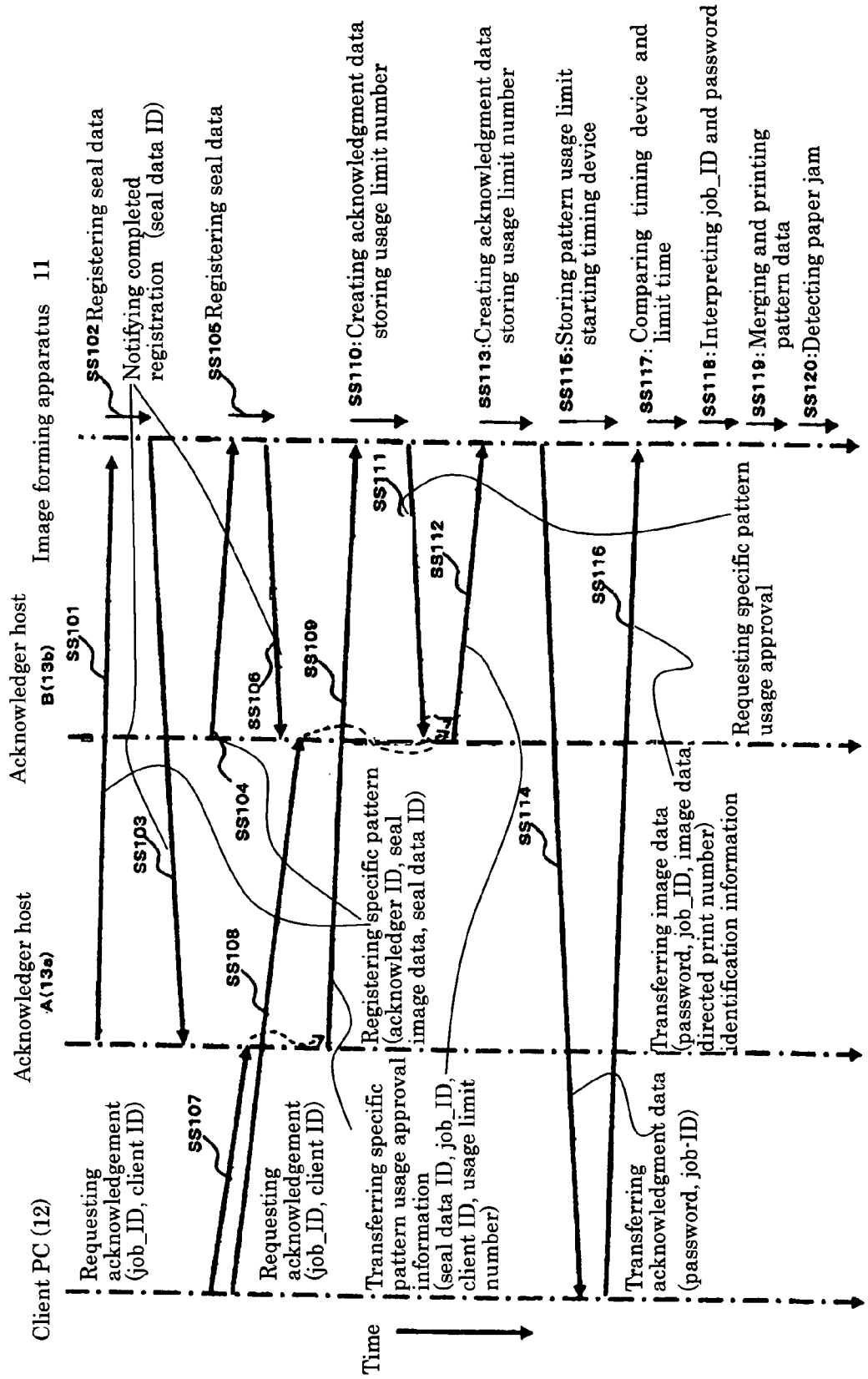
FIG. 23 is a schematic view showing a data flow of an image forming system according to the fifth embodiment of the present invention.
Figure 24:
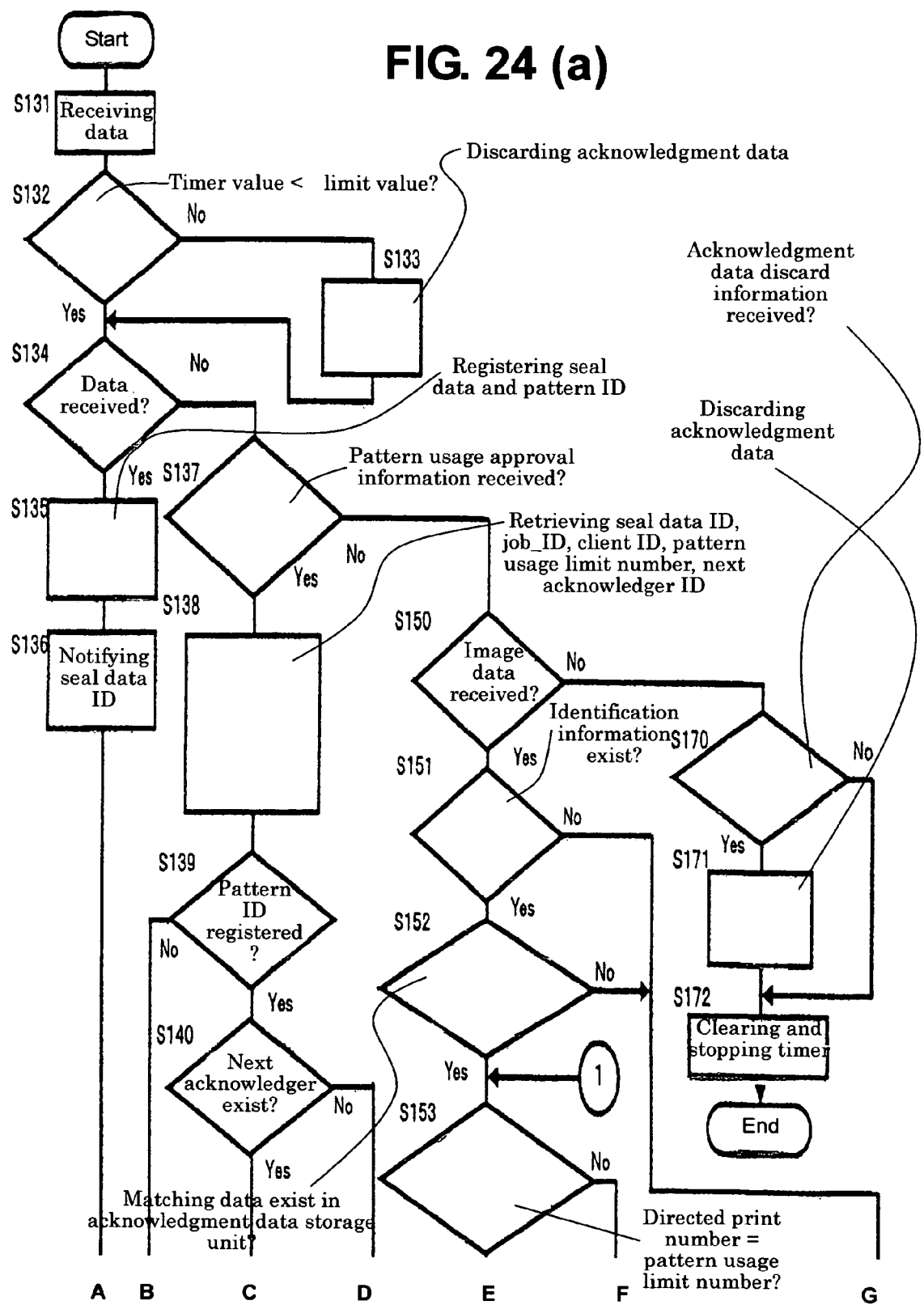
FIGS. 24(a) and 24(b) are flow charts showing an operation of the image forming apparatus according to the fifth embodiment of the present invention.
Figure 24:
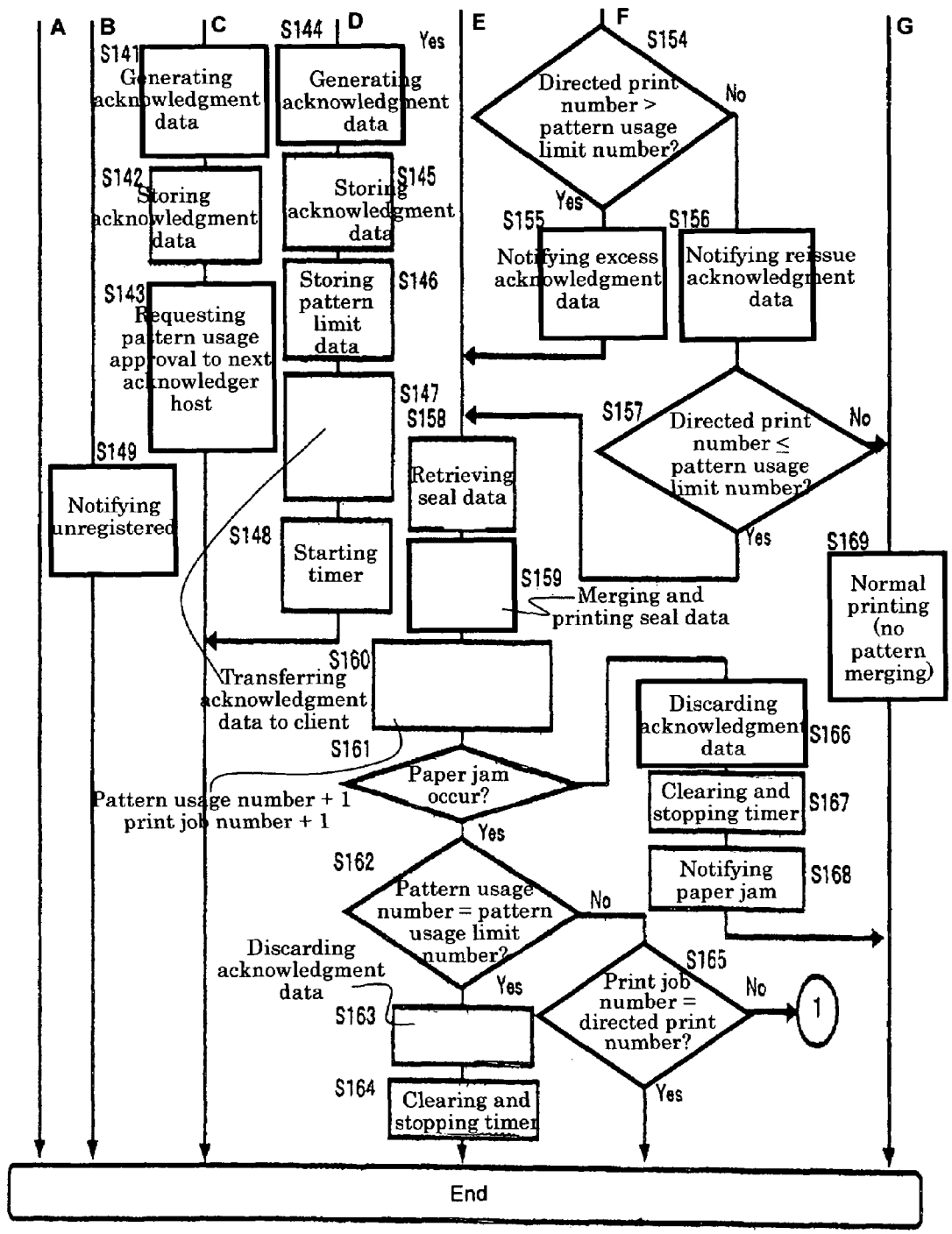

An operation of the image forming system and the image forming apparatus according to the fifth embodiment of the present invention will be explained next with reference to FIGS. 23 and 24.

An operation of the image forming system will be explained first. FIG. 23 is a schematic view showing a data flow of the image forming system according to the fifth embodiment of the present invention.

Similar to the process from step SS71 to step SS73 in the fourth embodiment, the specific pattern is registered from the acknowledger host A 13*a* (from step SS101 to step SS103), and, at the same time, the specific pattern is registered from the acknowledger host B 13*b*. (From step SS104 to step SS106)

In step SS107, the client PC 12 requests the acknowledger host A 13*a* to acknowledge the operation of merging and printing the seal data as the specific pattern. Similarly, in step SS108, the client PC 12 requests the acknowledger host B 13b to acknowledge the operation of merging and printing the seal data. In step SS109, the acknowledger host A 13a sends specific pattern usage approval information 71a to the image forming apparatus 11.

As shown in FIG. 25(a), the specific pattern usage approval information 71a contains the job_ID, the seal data ID, the client ID, and the next acknowledger ID. Since "N" is assigned in the next acknowledger ID, the image forming apparatus 11 is notified that there is the next acknowledger.

When the image forming apparatus 11 receives the specific pattern usage approval information 71a, the acknowledgment data generating unit 15 retrieves the job_ID, the seal data ID, the client ID, the pattern usage limit number, and the next acknowledger ID from the specific pattern usage approval information 71a. Then, the next acknowledgment request unit 135 determines whether there is the next acknowledger ID based on "N" assigned in the next acknowledger ID.

In step SS110, the pattern usage limit number is stored; the acknowledgment data 52 including the job_ID and the password is created; and the data including them and the seal data ID 1 corresponding to the acknowledger host A is stored in the image forming apparatus 117 shown in FIG. 26. For example, when the job_ID is "9822", the password is "∇▲◇×"; and the seal data ID 1 is "001". The seal data ID 2 is not assigned yet in this step.

In step SS111, the next acknowledgment request unit 135 of the image forming apparatus 11 requests the acknowledger host B 13b corresponding to the next acknowledger ID through the host i/f 14 to send specific pattern usage approval information 71b. In step SS112, the acknowledger host B 13b waiting for the request of the specific pattern usage approval information 71b sends the specific pattern usage approval information 71b to the image forming apparatus 11.

As shown in FIG. 25(b), the specific pattern usage approval information 71b contains the job_ID, the seal data ID, the client ID, and the next acknowledger ID. Since nothing is assigned in the next acknowledger ID, the image forming apparatus 11 is notified that there is no next acknowledger.

In step SS113, the pattern usage limit number is stored; the acknowledgment data 52 including the job_ID and the password is created; and the data including them and the seal data ID 2 corresponding to the acknowledger host B is stored in the acknowledgment data storage unit 17 shown in FIG. 26. For example, when the job_ID is "9822", the password is "∇▲◇×"; and the seal data ID 1 is "001"; the seal data ID 2 is "0001"; and the seal data ID 3 is not assigned.

Similar to the process from step SS77 to step SS83 in the fourth embodiment, from step SS114 to step SS120, after the acknowledgment data 52 created in step SS113 is sent to the client PC 12, the pattern usage limit is stored and the pattern usage timing unit 70 is started. After receiving the acknowledgment data 52, the client PC 12 adds the identification information 52* to the image data 53 similar to the second embodiment, and sends them to the image forming apparatus 11. After receiving them, the image forming apparatus 11 confirms the pattern usage limit, and performs authentication when it is within the pattern usage limit. After the seal image data corresponding to the job_ID is retrieved, the seal image data is merged and printed with the image data 53.

At this moment, the paper jam detection unit 102 in the printer engine unit 93 determines whether the paper jam occurs. When the paper jam occurs, the process of removing the paper jam and requesting the usage approval information reissue is performed, and the process of merging and printing is continued. (From step SS114 to step SS120)

An operation of the image forming apparatus according to the fourth embodiment of the present invention will be explained next with reference to FIGS. 24(a) and 24(b). FIGS. 24(a) and 24(b) are flow charts showing an operation of the image forming apparatus according to the fifth embodiment of the present invention.

Similar to the process from step S91 to step S97 in the fourth embodiment, after receiving the data, it is confirmed within the pattern usage limit, and the operation of registering the seal data is performed. (From step S131 to step S137)

In step S138 and step S139, when the data received is the specific pattern usage approval information 71, the job_ID, the seal data ID, the client ID, the pattern usage limit number, and the next acknowledger ID are retrieved. Then, it is determined whether the corresponding seal data exists in the specific pattern storage unit 19.

In step S140, when it is determined that the matching seal data exists, the next acknowledgment request unit 135 in an acknowledgment data creating unit 115 determines whether the next acknowledger ID retrieved in step S138 is valid. In determining, it is confirmed whether the next acknowledger ID retrieved is a specific format determined in advance.

When it is determined that the next acknowledger ID is valid, since the next acknowledger ID and the next acknowledger host exist, after the acknowledgment data 52 is created and stored, the specific pattern usage approval request is sent to the acknowledger host corresponding to the next acknowledger ID. For example, when the specific pattern usage approval information 71a shown in FIG. 25(a) is received, since "N" is assigned in the next acknowledger ID, it is determined that the acknowledger host exists. Accordingly, after the acknowledgment data 52 is created and stored, the specific pattern usage approval request is sent to the acknowledger host B 13b corresponding to the next acknowledger ID.

In step S141 and step S142, the acknowledgment data creating unit 115 confirms that the corresponding job_ID is stored in the acknowledgment data storage unit 17 shown in FIG. 26. When the corresponding acknowledgment data exists, the corresponding acknowledgment data is retrieved to be the acknowledgment data 52. When the corresponding job_ID does not exist, the acknowledgment data 52 is created with a new job_ID and a password, and is stored in the acknowledgment data storage unit 17.

In step S143, the specific pattern usage approval request is notified to the next acknowledgment request unit 135. Upon receiving, the next acknowledgment request unit 135 sends the specific pattern usage approval request to the acknowledger host B 13b through the host i/f 14.

When it is determined that the next acknowledger ID is not valid, since the next acknowledger ID and the next acknowledger host do not exist, the acknowledgment data 52 created at the acknowledgment data creating unit 115 according to the specific pattern usage approval information 71b is stored in the acknowledgment data storage unit 17. The pattern usage limit number is stored in the pattern usage limit number directing unit 44. Then, the acknowledgment data 52 created is sent to the client PC 12, and the pattern usage timing unit 70 is started. (From step S144 to step S149) In step S149, when the seal data corresponding to the seal data ID does not exist, it is notified that the pattern is unregistered through an operation similar to step S105 in the fourth embodiment.

In a process from step S150 to step S168, similar to that from step S106 to step S124 in the fourth embodiment, the acknowledgment data stored in step S142 is compared with the identification information 52* added to the acknowledgment data 52 received for authentication. Then, the acknowledgment data excess notification or the acknowledgment data reissue notification is sent through the comparison of the directed print number and the pattern usage limit number; and the operation of merging and printing is performed within the pattern usage limit number. Then, it is determined whether the paper jam occurs. When it is determined that the paper jam occurs, the acknowledgment data is discarded, and the timer is cleared and stopped. Further, it is notified that the paper jam occurs. When the usage number of the seal data reaches the pattern usage limit number, the corresponding acknowledgment data is discarded.

In step S169, similar to step S125 in the fourth embodiment, when it is not acknowledged with the identification information 52*; the matching data is not in the acknowledgment data storage unit 17; and the directed print number is greater than the pattern usage limit number, the operation of merging and printing the seal data should not be performed. Accordingly, the printer engine unit 23 performs the normal printing without the operation of merging and printing.

Similar to the process from step S126 to step S128 in the fourth embodiment, it is determined whether the received data is the acknowledgment data discard direction, and the value of the pattern usage timing unit 70 is cleared to zero, thereby completing the operation of merging and printing the specific pattern. (From step S170 to step S172)

Through the operation described above, as shown in FIG. 27, the seal data 50 and the image data 53 are merged with the two acknowledger hosts, and are printed as the merged data 54.

For example, when the job_ID is "9822", the acknowledger host A 13*a* registers the seal data ID 1 as "0001", and the acknowledger host B 13*b* registers the seal data ID 2 as "0002". When the usage of the seal data IDs is acknowledged at the acknowledger hosts, the image forming apparatus 11 creates and stores the acknowledgment data 52 as shown in the second line in the acknowledgment data storage unit 17 in FIG. 26, and sends the acknowledgment data 52 to the client PC 12. After the client PC 12 sends the identification information 52* and the acknowledgment data 52, the authentication is performed with the identification information 52* and the acknowledgment data 52. Then, the seal data corresponding to the seal data ID 1 "0001" and the seal data ID 2 "0002" is retrieved from the specific pattern storage unit 19, and is merged with the image data 53 to create the merged data 54, thereby printing the same.

As described above, in the image forming system according to the fifth embodiment, it is possible to merge and print the specific pattern acknowledged by a plurality of acknowledgers and the arbitrary image data. Accordingly, it is possible to securely prevent unauthorized usage of the seal data.

As described above, the present invention is applicable to the image forming apparatus and the image forming system such as a printer device, a facsimile device, a copier, and a combination thereof having a function of overlapping a specific pattern on a document.

The disclosure of Japanese Patent Application No. 2005-285177, filed on Sep. 29, 2005, is incorporated in the application.

While the invention has been explained with reference to the specific embodiments of the invention, the explanation is illustrative and the invention is limited only by the appended claims.

What is claimed is:

1. An image forming apparatus comprising:
    a first storage unit for storing a specific pattern together with an identification mark;
    an acknowledgment data generating unit for generating acknowledgment data per a notice of usage approval of the specific pattern;
    a second storage unit for storing the acknowledgment data together with the identification mark; and
    a merging unit for merging and printing image data and the specific pattern upon receiving the image data together with identification information corresponding to the acknowledgment data.

2. The image forming apparatus according to claim 1, wherein said second storage unit is arranged to discard the acknowledgment data corresponding to the specific pattern each time the specific pattern is merged and printed or when the specific pattern is used for a specific number of times.

3. The image forming apparatus according to claim 1, wherein said second storage unit is arranged to discard the acknowledgment data after a specific period of time elapses after the acknowledgment data is generated.

4. The image forming apparatus according to claim 1, wherein said acknowledgment data generating unit is arranged to discard the acknowledgment data corresponding to the specific pattern and generate different acknowledgment data when a paper jam occurs upon merging and printing the image data and the specific pattern.

5. The image forming apparatus according to claim 1, wherein said acknowledgment data generating unit is arranged to generate the acknowledgment data according to the notice of usage approval of a plurality of specific patterns, said merging unit merging and printing the image data and the plurality of the specific patterns upon receiving the image data together with the identification information corresponding to the acknowledgment data.

6. A image forming system comprising the image forming apparatus according to claim 1; a terminal device for sending a notice of approval request of merging and printing with the specific pattern; and an upper device for directing registration of the specific pattern and sending the notice of usage approval of the specific pattern according to usage approval of the specific pattern from the terminal device.

7. The image forming system according to claim 6, wherein said upper device is arranged to be capable of specifying a usage number of the specific pattern.

8. The image forming system according to claim 6, wherein said upper device is arranged to be capable of specifying a time during which the specific pattern can be used.

9. The image forming system according to claim 6, wherein said upper device is arranged to reissue the notice of usage approval of the specific pattern upon receiving a notice of paper jam.

10. The image forming system according to claim 6, wherein said upper device includes a plurality of devices so that the specific pattern of each of the devices is acknowledged for being merged and printed.

11. A method of forming an image, comprising the steps of:
    a first step of storing a specific pattern together with an identification mark;
    a second step of generating acknowledgment data by a unit in an image forming apparatus each time upon receiving a notice of usage approval of the specific pattern; and
    a third step of merging and printing image data and the specific pattern upon receiving the image data together with identification information corresponding to the acknowledgment data.

12. The method according to claim 11, further comprising the step of discarding the acknowledgment data corresponding to the specific pattern each time the specific pattern is merged and printed or when the specific pattern is used for a specific number of times.

13. The method according to claim 11, further comprising the step of discarding the acknowledgment data after a specific period of time elapses after the acknowledgment data is generated.

14. The method according to claim 11, further comprising the step of discarding the acknowledgment data corresponding to the specific pattern and generating different acknowledgment data when a paper jam occurs upon merging and printing the image data and the specific pattern.

15. The method according to claim 11, further comprising the steps of generating the acknowledgment data according to the notice of usage approval of a plurality of specific patterns, and merging and printing the image data and the plurality of the specific patterns upon receiving the image data together with the identification information corresponding to the acknowledgment data.

* * * * *